US012672144B2

(12) United States Patent
Liu et al.

(10) Patent No.: US 12,672,144 B2
(45) Date of Patent: Jun. 30, 2026

(54) METHOD AND DEVICE USED IN NODE FOR WIRELESS COMMUNICATION

(71) Applicant: Quectel Wireless Solutions Co., Ltd., Shanghai (CN)

(72) Inventors: Zheng Liu, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 329 days.

(21) Appl. No.: 18/467,945

(22) Filed: Sep. 15, 2023

(65) Prior Publication Data

US 2024/0008043 A1        Jan. 4, 2024

Related U.S. Application Data

(63) Continuation of application No. PCT/CN2021/125392, filed on Oct. 21, 2021.

(30) Foreign Application Priority Data

Mar. 18, 2021        (CN) .......................... 202110288299.5

(51) Int. Cl.
*H04W 4/00*          (2018.01)
*H04L 1/1829*          (2023.01)
(Continued)

(52) U.S. Cl.
CPC ........... *H04W 72/21* (2023.01); *H04L 1/1854* (2013.01); *H04L 5/0055* (2013.01); *H04W 72/563* (2023.01); *H04W 92/10* (2013.01)

(58) Field of Classification Search
CPC ... H04L 43/0817; H04L 5/005; H04L 5/0007; H04W 56/0015; H04W 24/10;
(Continued)

(56) References Cited

U.S. PATENT DOCUMENTS 11,968,676  B2      4/2024    Li et al.
2019/0103947  A1      4/2019    Park
(Continued)

FOREIGN PATENT DOCUMENTS

CN          111247857  A        6/2020
CN          111314033  A        6/2020
(Continued)

OTHER PUBLICATIONS

International Search Report and Written Opinion issued in corresponding PCT Application No. PCT/CN2021/125392, dated Jan. 12, 2022.
(Continued)

*Primary Examiner* — Phuongchau Ba Nguyen
(74) *Attorney, Agent, or Firm* — Westbridge IP LLC

(57)        ABSTRACT

Disclosed are a method and a device used in a node of wireless communication. A first node device for wireless communication includes: a first receiver to receive first information and to receive first signaling and second signaling; and a first transmitter to transmit a first signal in a target air-interface resource block, the first signal carrying a third bit block and a fourth bit block. The first bit block is used to generate the third bit block, the second bit block is used to generate the fourth bit block, and an output obtained after all bits in the third bit block and all bits in the fourth bit block are subjected to a first channel coding is used to generate the first signal.

19 Claims, 6 Drawing Sheets

(51) Int. Cl.

| | |
|---|---|
| *H04L 5/00* | (2006.01) |
| *H04W 72/21* | (2023.01) |
| *H04W 72/563* | (2023.01) |
| *H04W 92/10* | (2009.01) |

(58) Field of Classification Search
CPC ..... H04W 24/04; H04W 16/28; H04W 92/20; H04W 28/04; H04W 72/04; H04W 72/042; H04W 88/08; H04W 28/08; H04W 28/084; H04W 36/22; H04W 72/12; H04B 7/022; H04B 7/0617
See application file for complete search history.

(56) References Cited

U.S. PATENT DOCUMENTS

| | | | |
|---|---|---|---|
| 2020/0228248 A1 | 7/2020 | Islam et al. | |
| 2020/0259625 A1 | 8/2020 | Papasakellariou | |
| 2021/0045111 A1* | 2/2021 | Zhang | H04L 1/004 |
| 2021/0359792 A1* | 11/2021 | Wu | H04L 5/0094 |
| 2022/0377765 A1* | 11/2022 | Zhang | H04L 5/0046 |
| 2023/0022663 A1* | 1/2023 | Zhang | H04L 5/0064 |
| 2024/0007246 A1* | 1/2024 | Liu | H04L 5/0048 |
| 2024/0008043 A1* | 1/2024 | Liu | H04W 72/563 |
| 2024/0196405 A1* | 6/2024 | Liu | H04L 1/1854 |

FOREIGN PATENT DOCUMENTS

| | | | |
|---|---|---|---|
| CN | 111436130 A | 7/2020 | |
| CN | 111448839 A | 7/2020 | |
| CN | 111698065 A | 9/2020 | |
| CN | 111800236 A | 10/2020 | |
| CN | 111835480 A | 10/2020 | |
| CN | 112187424 A | 1/2021 | |
| CN | 112333776 A | 2/2021 | |
| CN | 112351493 A | 2/2021 | |
| CN | 113498195 A | 10/2021 | |
| WO | 2020135214 A1 | 7/2020 | |
| WO | 2020146247 A2 | 7/2020 | |
| WO | 2020202068 A1 | 10/2020 | |
| WO | 2020257692 A1 | 12/2020 | |

OTHER PUBLICATIONS

Huawei et al., R1-1903955 UCI enhancements for URLLC, 3GPP tsg_ran\wg1_rl1, dated Apr. 3, 2019.

Qualcomm Incorporated, R1-1912940 Enhancements to Scheduling and HARQ Operation for NR-U, 3GPP tsg_ran\wg1_rl1, dated Nov. 8, 2019.

Extended European Search Report issued in counterpart European Patent Application No. 21931219.6, dated Sep. 23, 2024.

MediaTek Inc., Discussion and Decision on Enhancement of UCI for URLLC, R1-1900209, 3GPP TSG RAN WG1 Ad-Hoc Meeting 1901, dated Jan. 12, 2019.

\* cited by examiner

100

First node

Receive first information —101

Receive first signaling and second signaling —102

103

Transmit a first signal in a target air-interface resource block

EPS 200

HSS —220

NG-RAN 202

MME/AMF/UPF —211    Other MME/AMF/UPF —214

UE —201

NR node B —203

First link

Third link

Other NR node B —204

S-GW —212    P-GW —213

Internet service —230

EPC/5G-CN 210

UE —241    Second link

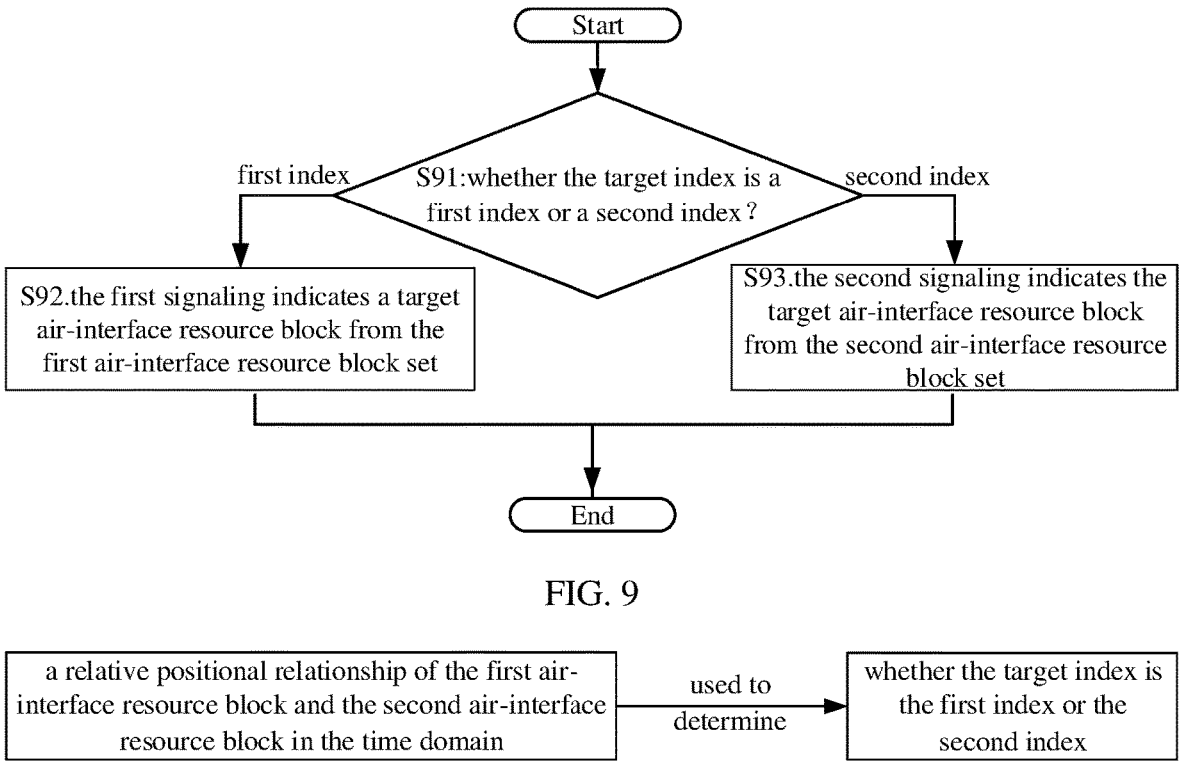
FIG. 9
a relative positional relationship of the first air-interface resource block and the second air-interface resource block in the time domain → used to determine → whether the target index is the first index or the second index
FIG. 10
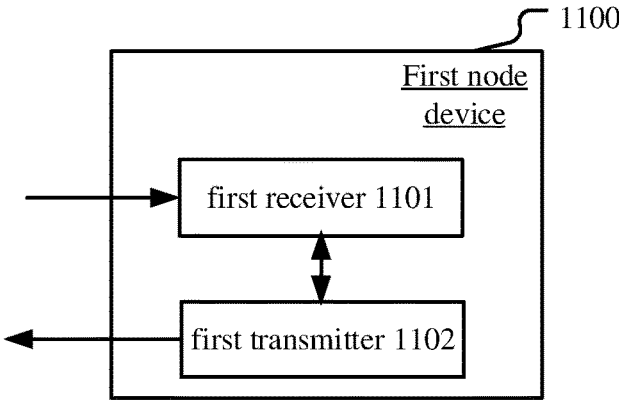
FIG. 11

METHOD AND DEVICE USED IN NODE FOR WIRELESS COMMUNICATION

CROSS-REFERENCE TO RELATED APPLICATIONS

The present application is a continuation of PCT Patent Application No. PCT/CN2021/125392, filed on Oct. 21, 2021, which claims priority to Chinese Patent Application No. 202110288299.5, filed on Mar. 18, 2021. All of the aforementioned applications are incorporated herein by reference in their entireties.

TECHNICAL FIELD

The various embodiments described in this document relate in general to the technical field of wireless communication, and more specifically to a method and device for a wireless communication system, in particular to a method and device for transmitting a wireless signal in a wireless communication system supporting a cellular network.

BACKGROUND

In a 5G system, enhance mobile broadband (eMBB) and ultra-reliable and low latency communication (URLLC) are two typical service types. In 3rd generation partner project (3GPP) new radio (NR) release 15, a new modulation and coding scheme (MCS) table has been defined for the lower target block error ratio (BLER) requirement ($10^-5$) for URLLC service. In order to support higher requirements of URLLC services, such as higher reliability (e.g., target BLER is $10^-6$), lower latency (e.g., 0.5 ms to 1 ms), etc., in 3GPP NR release 16, downlink control information (DCI) signaling can indicate whether scheduled services are services of low-priority or high-priority, where the low-priority corresponds to URLLC services and the high-priority corresponds to eMBB services. When low-priority transmission overlaps high-priority transmission in a time domain, the high-priority transmission is executed and the low-priority transmission is abandoned.

URLLC enhanced work items (WI) for NR release 17 were agreed at 86th 3GPP conference on RAN. However, multiplexing of different services in the user equipment (UE) is still to be researched.

SUMMARY

Embodiments of the present disclosure provide a method for a first node of wireless communication, including: receiving first information and receiving first signaling and second signaling; and transmitting a first signal in a target air-interface resource block, the first signal carrying a third bit block and a fourth bit block, where the first information indicates that the first signaling includes a first field, the first signaling is used to determine a first bit block, the second signaling is used to determine a second bit block, the first bit block is used to generate the third bit block, the second bit block is used to generate the fourth bit block, and an output obtained after all bits in the third bit block and all bits in the fourth bit block are subjected to a first channel coding is used to generate the first signal; the target air-interface resource block corresponds to a target index, the target index is equal to a first index or a second index, and the first index is not equal to the second index; in response to the target index being equal to the first index, the third bit block is the first bit block, and the fourth bit block is the second bit block or an output obtained after the second bit block is subjected to a second operation; and in response to the target index being equal to the second index, the third bit block is an output obtained after the first bit block is subjected to a first operation, and the fourth bit block is the second bit block, and where the first bit block corresponds to the first index, and the second bit block corresponds to the second index.

Embodiments of the disclosure provide a method for a second node in wireless communication, including: transmitting first information, and transmitting first signaling and second signaling; and receiving a first signal in a target air-interface resource block, the first signal carrying a third bit block and a fourth bit block, where the first information indicates that the first signaling includes a first field, the first signaling is used to determine a first bit block, the second signaling is used to determine a second bit block, the first bit block is used to generate the third bit block, the second bit block is used to generate the fourth bit block, and an output obtained after all bits in the third bit block and all bits in the fourth bit block are subjected to a first channel coding is used to generate the first signal; the target air-interface resource block corresponds to a target index, the target index is equal to a first index or a second index, and the first index is not equal to the second index; in response to the target index being equal to the first index, the third bit block is the first bit block, and the fourth bit block is the second bit block or an output obtained after the second bit block is subjected to a second operation; and in response to the target index being equal to the second index, the third bit block is an output obtained after the first bit block is subjected to a first operation, and the fourth bit block is the second bit block, and where the first bit block corresponds to the first index, and the second bit block corresponds to the second index.

Embodiments of the disclosure provide a first node device for wireless communication, including: a first receiver to receive first information and to receive first signaling and second signaling; and a first transmitter to transmit a first signal in a target air-interface resource block, the first signal carrying a third bit block and a fourth bit block, where the first information indicates that the first signaling includes a first field, the first signaling is used to determine a first bit block, the second signaling is used to determine a second bit block, the first bit block is used to generate the third bit block, the second bit block is used to generate the fourth bit block, and an output obtained after all bits in the third bit block and all bits in the fourth bit block are subjected to a first channel coding is used to generate the first signal; the target air-interface resource block corresponds to a target index, the target index is equal to a first index or a second index, and the first index is not equal to the second index; in response to the target index being equal to the first index, the third bit block is the first bit block, and the fourth bit block is the second bit block or an output obtained after the second bit block is subjected to a second operation; and in response to the target index being equal to the second index, the third bit block is an output obtained after the first bit block is subjected to a first operation, and the fourth bit block is the second bit block, and where the first bit block corresponds to the first index, and the second bit block corresponds to the second index.

Embodiments of the disclosure provide a second node device for wireless communication, including: a second transmitter to transmit first information, and to transmit first signaling and second signaling; and a second receiver to receive a first signal in a target air-interface resource block, the first signal carrying a third bit block and a fourth bit block, where the first information indicates that the first signaling includes a first field, the first signaling is used to determine a first bit block, the second signaling is used to determine a second bit block, the first bit block is used to generate the third bit block, the second bit block is used to generate the fourth bit block, and an output obtained after all bits in the third bit block and all bits in the fourth bit block are subjected to a first channel coding is used to generate the first signal; the target air-interface resource block corresponds to a target index, the target index is equal to a first index or a second index, and the first index is not equal to the second index; in response to the target index being equal to the first index, the third bit block is the first bit block, and the fourth bit block is the second bit block or an output obtained after the second bit block is subjected to a second operation; and in response to the target index being equal to the second index, the third bit block is an output obtained after the first bit block is subjected to a first operation, and the fourth bit block is the second bit block, and where the first bit block corresponds to the first index, and the second bit block corresponds to the second index.

BRIEF DESCRIPTION OF THE DRAWINGS

Other features, objectives, and advantages of the present disclosure will become more apparent by referring to the detailed description of non-limiting embodiments with reference to the following drawings.

FIG. 9 shows a schematic flow chart of determining whether first signaling or second signaling is used to indicate a target air-interface resource block according to an embodiment of the present disclosure.

FIG. 10 shows a schematic diagram of a relationship between a first air-interface resource block, a second air-interface resource block, and a target index according to an embodiment of the present disclosure.

FIG. 11 shows a structural block diagram of a processing device in a first node device according to an embodiment of the present disclosure.

DETAILED DESCRIPTION OF THE EMBODIMENTS

Figure 1:
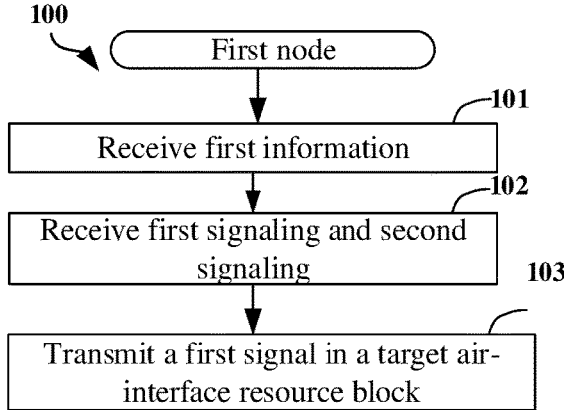
FIG. 1 illustrates a process flow chart of a first node according to an embodiment of the present disclosure.

In the discussion of NR URLLC project, the requirement for reliability in uplink control information (UCI) of high-priority is higher than that in UCI of low-priority. When UCI with different priorities are multiplexed to a same physical uplink control channel (PUCCH), how to ensure the reliability of UCI with different priorities is a technical problem to be solved.

In view of the above problems, embodiment of the present disclosure provides a method for a first node in wireless communication. The method includes following operations: receiving first information; receiving first signaling and second signaling; transmitting a first signal in a target air-interface resource block, the first signal carrying a third bit block and a fourth bit block; where the first information indicates that the first signaling includes a first field; the first signaling is used to determine a first bit block; the second signaling is used to determine a second bit block; the first bit block is used to generate the third bit block; the second bit block is used to generate the fourth bit block; an output obtained after all bits in the third bit block and all bits in the fourth bit block are subjected to a first channel coding is used to generate the first signal; the target air-interface resource block corresponds to a target index, the target index is equal to a first index or a second index, and the first index is not equal to the second index; when the target index is equal to the first index, the third bit block is the first bit block, and the fourth bit block is the second bit block or an output obtained after the second bit block is subjected to a second operation; when the target index is equal to the second index, the third bit block is an output obtained after the first bit block is subjected to a first operation, and the fourth bit block is the second bit block; the first bit block corresponds to the first index, and the second bit block corresponds to the second index. In the description of above problems, an uplink transmission scenario is used as an example for illustration. Embodiments of the present disclosure are also applicable to a downlink transmission scenario and a sidelink transmission scenario, and the technical effects similar to that in the uplink scenario can also be obtained. In addition, adopting a unified solution for different scenarios (including but not limited to the uplink transmission scenario, the downlink transmission scenario, and the sidelink transmission scenario) also helps to reduce hardware complexity and cost. It is to be noted that the embodiments in the user equipment of the present disclosure and the features in the embodiments can be applied to the base station and vice versa without conflict. Embodiments of the present disclosure and features in the embodiments may be arbitrarily combined with each other without conflict.

As an example, the terminologies in the disclosure are interpreted with reference to the definition of the 3GPP specification protocol TS36 series.

As an example, the terminologies in the disclosure are interpreted with reference to the definition of the 3GPP specification protocol TS38 series.

As an example, the terminologies in the disclosure are interpreted with reference to the definition of the 3GPP specification protocol TS37 series.

As an example, the terminologies in the disclosure are interpreted with reference to the definition of the institute of electrical and electronics engineers (IEEE) specification protocol.

As an example, embodiments of the disclosure aim to solve the following problems of how to ensure the reliability requirements of UCI with different priorities when UCI (e.g., hybrid automatic repeat request acknowledgement (HARQ-ACK) with different priorities are multiplexed to a same PUCCH for transmission.

As an example, embodiments of the disclosure aim to solve the following problems of how to ensure that UCI of high-priority has higher transmission reliability when UCI with different priorities are multiplexed on the same PUCCH.

As an example, embodiments of the disclosure aim to address following problems of how to ensure the reliability of UCI for different service types when the UCI for different service types (e.g., HARQ-ACK) are multiplexed to a same physical channel (e.g., PUCCH) for transmission since there are different requirements on transmission reliability of UCI for different service types (e.g., URLLC or eMBB).

As an example, embodiments of the disclosure aim to solve following problems of how to determine transmission resources allocated to UCI with different priorities according to priorities corresponding to the same PUCCH when UCI (e.g., HARQ-ACK) with different priorities are multiplexed to the same PUCCH for transmission.

As an example, embodiments of the disclosure aim to solve following problems of how to determine the transmission resources allocated to the UCI for different service types according to service types corresponding to the same physical channel when the UCI for different service types (e.g., HARQ-ACK) are multiplexed to a same physical channel (e.g., PUCCH) for transmission since there are different requirements on transmission reliability of UCI for different service types (e.g., URLLC or eMBB).

As an example, embodiments of the disclosure aim to solve following problems of how to determine the transmission resources allocated to the different classes of UCI according to the classes corresponding to the same physical channel when different classes of UCI (e.g., HARQ-ACK) are multiplexed to a same physical channel for transmission.

As an example, embodiments of the disclosure aim to solve following problems of how to ensure the reliability requirements of different classes of UCI (e.g., HARQ-ACK) when different classes of UCI (e.g., HARQ-ACK) are multiplexed onto the same physical channel for transmission.

As an example, the essence of the above method is that when UCI of high-priority (high-priority UCI) is multiplexed onto a physical channel reserved for UCI of low-priority (low-priority UCI) for transmission, transmission resources used for the high-priority UCI in the physical channel are increased by increasing transmitted bits (e.g., additional encoding or additional check bits for the high-priority UCI, etc.) related to the high-priority UCI to ensure transmission performance of the high-priority UCI.

As an example, the essence of the above method is that when the low-priority UCI is multiplexed onto a physical channel reserved for the high-priority UCI for transmission, transmission resources used for the low-priority UCI in the physical channel are limited by reducing transmitted information bits related to the low-priority UCI.

As an example, the method has the advantage of ensuring higher transmission reliability of the high-priority UCI.

As an example, the method has the advantage of ensuring the transmission reliability of the high-priority UCI when the high-priority UCI is multiplexed onto the physical channel reserved for the low-priority UCI.

As an example, the method has the advantage that when the low-priority UCI is multiplexed onto the physical channel reserved for the high-priority UCI, the transmitted information bits related to the low-priority UCI are limited, and the problem that low-priority information occupies the transmission resources of the high-priority UCI excessively is avoided.

As an example, the method in the present disclosure has following advantages.

Different classes of UCI are allowed to be multiplexed on a same physical channel.

The high-priority UCI has higher transmission reliability.

When the high-priority UCI is multiplexed onto the physical channel reserved for the low-priority UCI, the transmission reliability of the high-priority UCI is ensured.

When the low-priority UCI is multiplexed onto the physical channel reserved for the high-priority UCI, the transmitted information bits related to the low-priority UCI are limited, and the problem that the low-priority information occupies the transmission resources of the high-priority UCI excessively is avoided.

The technical proposal of the present disclosure will be described in further detail below in conjunction with the accompanying drawings, and it is to be noted that the embodiments of the present disclosure and the features in the embodiments can be arbitrarily combined with each other without conflict.

Embodiment 1

As shown in FIG. 1, Embodiment 1 illustrates a process flow chart of a first node according to an embodiment of the present disclosure.

In Embodiment 1, at step 101, the first node in the present disclosure receives first information. At step 102, the first node receives first signaling and second signaling. At step 103, the first node transmits a first signal in a target air-interface source block.

In Embodiment 1, the first signal carries a third bit block and a fourth bit block. The first information indicates that the first signaling includes a first field. The first signaling is used to determine a first bit block. The second signaling is used to determine a second bit block. The first bit block is used to generate the third bit block. The second bit block is used to generate the fourth bit block. An output after all bits in the third bit block and all bits in the fourth bit block are subjected to a first channel coding is used to generate the first signal. A target air-interface resource block corresponds to a target index, the target index is equal to a first index or a second index, and the first index is not equal to the second index. When the target index is equal to the first index, the third bit block is the first bit block, and the fourth bit block is the second bit block or an output after the second bit block is subjected to a second operation (i.e., a second bit block subjected to the second operation). When the target index is equal to the second index, the third bit block is an output after the first bit block is subjected to a first operation (i.e., a first bit block subjected to the first operation), and the fourth bit block is the second bit block. The first bit block corresponds to the first index, and the second bit block corresponds to the second index.

As an example, the first signal includes a wireless signal.

As an example, the first signal includes a radio frequency (RF) signal.

As an example, the first signal includes a baseband signal.

As an example, the first signaling is a radio resource control (RRC) layer signaling.

As an example, the first signaling includes one or more fields in an RRC layer signaling.

As an example, the first signaling is dynamically configured.

As an example, the first signaling is a physical layer signaling.

As an example, the first signaling includes a physical layer signaling.

As an example, the first signaling includes a higher layer signaling.

As an example, the first signaling is a downlink control information (DCI) signaling.

As an example, the first signaling includes one or more fields in one DCI.

As an example, the first signaling includes one or more fields in an information element (IE).

As an example, the first signaling is a downlink grant signaling.

As an example, the first signaling is transmitted over a downlink physical layer control channel (i.e., a downlink channel that can only be configured to carry a physical layer signaling).

As an example, the downlink physical layer control channel is a physical downlink control channel (PDCCH).

As an example, the downlink physical layer control channel is a short PDCCH (sPDCCH).

As an example, the downlink physical layer control channel is a narrow band PDCCH (NB-PDCCH).

As an example, the first signaling is DCI format 1_0, and for the definition of the DCI format 1_0, reference may be made to section 7.3.1.1 of 3GPP TS38.212.

As an example, the first signaling is DCI format 1_1, and for the definition of the DCI format 1_1, reference may be made to section 7.3.1.1 of 3GPP TS38.212.

As an example, the first signaling is DCI format 1_2, and for the definition of the DCI format 1_2, reference may be made to section 7.3.1.1 of 3GPP TS38.212.

As an example, the first signaling is a signaling used to schedule a downlink physical layer data channel.

As an example, the downlink physical layer data channel is a physical downlink shared channel (PDSCH).

As an example, the downlink physical layer data channel is a short PDSCH (sPDSCH).

As an example, the downlink physical layer data channel is a narrow band PDSCH (NB-PDSCH).

As an example, the second signaling is a RRC layer signaling.

As an example, the second signaling includes one or more fields in an RRC layer signaling.

As an example, the second signaling is dynamically configured.

As an example, the second signaling is a physical layer signaling.

As an example, the second signaling includes a physical layer signaling.

As an example, the second signaling includes a higher layer signaling.

As an example, the second signaling is DCI.

As an example, the second signaling includes one or more fields in one DCI.

As an example, the second signaling includes one or more fields in an IE.

As an example, the second signaling is a downlink scheduling signaling (downlink grant signaling).

As an example, the second signaling is transmitted over a downlink physical layer control channel (i.e., a downlink channel that can only be used to carry a physical layer signaling).

As an example, the second signaling is a signaling used to schedule a downlink physical layer data channel.

As an example, the second signaling is DCI format 1_0, and for the definition of the DCI format 1_0, reference may be made to section 7.3.1.2 of 3GPP TS38.212.

As an example, the second signaling is DCI format 1_1, and for the definition of the DCI format 1_1, reference may be made to section 7.3.1.2 of 3GPP TS38.212.

As an example, the second signaling is DCI format 1_2, and for the definition of the DCI format 1_2, reference may be made to section 7.3.1.2 of 3GPP TS38.212.

As an example, the target air-interface resource block includes a positive integer number of resource elements (REs).

As an example, each of the REs occupies one multi-carrier symbol in a time domain and occupies one subcarrier in a frequency domain.

As an example, the multi-carrier symbol is an orthogonal frequency division multiplexing (OFDM) symbol.

As an example, the multi-carrier symbol is a single carrier-frequency division multiple access (SC-FDMA) symbol.

As an example, the multi-carrier symbol is a discrete Fourier transform spread OFDM (DFT-S-OFDM) symbol.

As an example, the target air-interface resource block includes a positive integer number of subcarriers in the frequency domain.

As an example, the target air-interface resource block includes a positive integer number of physical resource blocks (PRBs) in the frequency domain.

As an example, the target air-interface resource block includes a positive integer number of resource blocks (RBs) in the frequency domain.

As an example, the target air-interface resource block includes a positive integer number of multi-carrier symbols in the time domain.

As an example, the target air-interface resource block includes a positive integer number of time slots in the time domain.

As an example, the target air-interface resource block includes a positive integer number of sub-slots in the time domain.

As an example, the target air-interface resource block includes a positive integer number of milliseconds (ms) in the time domain.

As an example, the target air-interface resource block includes a positive integer number of discontinuous time slots in the time domain.

As an example, the target air-interface resource block includes a positive integer number of consecutive time slots in the time domain.

As an example, the target air-interface resource block includes a positive integer number of sub-frames in the time domain.

As an example, the target air-interface resource block is configured by a higher layer signaling.

As an example, the target air-interface resource block is configured by a RRC signaling.

As an example, the target air-interface resource block is configured by a medium access control layer control element (MAC CE) signaling.

As an example, the target air-interface resource block includes a physical uplink control channel (PUCCH).

As an example, the target air-interface resource block includes a physical uplink shared channel (PUSCH).

As an example, the target air-interface resource block includes a sPUSCH.

As an example, the target air-interface resource block includes an NB-PUSCH.

As an example, the target air-interface resource block includes a physical sidelink shared channel (PSSCH).

As an example, the target air-interface resource block includes resources scheduled on an uplink.

As an example, the target air-interface resource block includes resources scheduled on a sidelink.

As an example, the first bit block includes HARQ-ACK.

As an example, the first bit block includes a channel state information (CSI) report.

As an example, the first bit block includes an uplink scheduling request (SR).

As an example, the first bit block includes a transport block (TB).

As an example, the first bit block includes a code block group (CBG).

As an example, the second bit block includes HARQ-ACK.

As an example, the second bit block includes a CSI report.

As an example, the second bit block includes a SR.

As an example, the second bit block includes a TB.

As an example, the second bit block includes a CBG.

As an example, the third bit block includes HARQ-ACK.

As an example, the third bit block includes a CSI report.

As an example, the third bit block includes a SR.

As an example, the third bit block includes a TB.

As an example, the third bit block includes a CBG.

As an example, the third bit block includes bits related to HARQ-ACK.

As an example, the third bit block includes bits related to a CSI report.

As an example, the third bit block includes bits related to a SR.

As an example, the fourth bit block includes HARQ-ACK.

As an example, the fourth bit block includes a CSI report.

As an example, the fourth bit block includes a SR.

As an example, the fourth bit block includes a TB.

As an example, the fourth bit block includes a CBG.

As an example, the fourth bit block includes bits related to HARQ-ACK.

As an example, the fourth bit block includes bits related to a CSI report.

As an example, the fourth bit block includes bits related to a SR.

As an example, the HARQ-ACK in the present disclosure includes one HARQ-ACK bit.

As an example, the HARQ-ACK in this disclosure includes a HARQ-ACK codebook.

As an example, the HARQ-ACK in the present disclosure includes a HARQ-ACK sub-codebook.

As an example, the HARQ-ACK in this disclosure includes a positive integer number of bits.

As an example, the HARQ-ACK in this disclosure includes a positive integer number of bits, and each bit of the positive integer number of bits indicates acknowledgement (ACK) or not acknowledgement (NACK).

As an example, the HARQ-ACK in the present disclosure includes a bit used to indicate whether a bit block or a signaling is correctly received.

As an example, the first bit block includes a positive integer number of bits.

As an example, the second bit block includes a positive integer number of bits.

As an example, the third bit block includes a positive integer number of bits.

As an example, the fourth bit block includes a positive integer number of bits.

As an example, the third bit block includes all or part of the bits in the first bit block.

As an example, the fourth bit block includes all or part of the bits in the second bit block.

As an example, a coding scheme employed in the first channel coding includes a polar code.

As an example, a coding scheme employed in the first channel coding includes a block code.

As an example, the first channel coding includes an associated operation of a channel coding.

As an example, the first signal includes an output obtained after all or part of bits in an output obtained after all bits in the third bit block and all bits in the fourth bit block are subjected to a first channel coding are sequentially subjected to some or all operations of: cyclic redundancy check (CRC) insertion, segmentation, coding block level CRC insertion, channel coding, rate matching, concatenation, scrambling, modulation, layer mapping, precoding, mapping to resource elements, multi-carrier symbol generation, and modulation and upconversion.

As an example, the target index is an index of the target air-interface resource block in a target air-interface resource block set. The target air-interface resource block set includes a plurality of air-interface resource blocks.

As an example, the target index is used to determine a target air-interface resource block set. The target air-interface resource block set includes a positive integer number of air-interface resource blocks and the target air-interface resource block is an air-interface resource block in the target air-interface resource block set.

In the above example, the first signaling or the second signaling is used to determine the target air-interface resource block from the target air-interface resource block set.

In the above example, the target air-interface resource block set is a first air-interface resource block set or a second air-interface resource block set.

As an example, the target air-interface resource block includes one of a high-priority PUCCH or a low-priority PUCCH.

As an example, the target air-interface resource block set includes a PUCCH resource set.

As an example, the target air-interface resource block set includes a positive integer number of PUCCH resource(s).

As an example, the target index is a priority index.

As an example, the target index is equal to 0 or 1.

As an example, the target index is equal to a numerical value.

As an example, the target index is used to determine one priority of a plurality of priorities.

As an example, the plurality of priorities include a high priority and a low priority.

As an example, the target index is used to determine a service type of a plurality of service types.

As an example, the plurality of service types include a URLLC service type and an eMBB service type.

As an example, the plurality of service types include services on different links.

As an example, the target index is used to determine one QoS of a plurality of quality of services (QoS).

As an example, the first index is a priority index.

As an example, the first index is equal to 0 or 1.

As an example, the first index is equal to a numerical value.

As an example, the first index is used to determine a priority of a plurality of priorities.

As an example, the first index is used to determine a service type of a plurality of service types.

As an example, the first index is used to determine one of a plurality of QoS.

As an example, the second index is a priority index.

As an example, the second index is equal to 0 or 1.

As an example, the second index is equal to a numerical value.

As an example, the second index is used to determine a priority of a plurality of priorities.

As an example, the second index is used to determine a service type of a plurality of service types.

As an example, the second index is used to determine one of a plurality of QoS.

As an example, the first index is equal to 1 and the second index is equal to 0.

As an example, the first index is equal to 0 and the second index is equal to 1.

As an example, the first index indicates a high priority and the second index indicates a low priority.

As an example, the first index indicates a low priority and the second index indicates a high priority.

As an example, the first index indicates a URLLC service type and the second index indicates an eMBB service type.

As an example, the first index indicates an eMBB service type and the second index indicates a URLLC service type.

As an example, the first index and the second index each indicate a corresponding QoS.

As an example, the first bit block includes HARQ-ACK corresponding to the first signaling.

As an example, the first signaling indicates the first index, and the first bit block includes HARQ-ACK corresponding to the first signaling.

As an example, the first signaling is used to indicate semi-persistent scheduling (SPS) release, and the HARQ-ACK corresponding to the first signaling indicates whether the first signaling is received correctly.

As an example, the first node receives a fifth bit block. The first signaling includes scheduling information for the fifth bit block, and the HARQ-ACK corresponding to the first signaling indicates whether the fifth bit block is correctly received.

As an example, the first signaling is used to indicate semi-static scheduling release, and the first bit block includes information for indicating whether the first signaling is received correctly.

As an example, the first node receives a fifth bit block. The first signaling includes scheduling information for the fifth bit block, and the first bit block includes information indicating whether the fifth bit block is correctly received.

As an example, the scheduling information includes at least one of an occupied time domain resource, an occupied frequency domain resource, MCS, configuration information of demodulation reference signals (DMRS), a hybrid automatic repeat request (HARQ) process identity, a redundancy version (RV), new data indicator (NDI), a transmitting antenna port, and a corresponding transmission configuration indicator (TCI) state.

As an example, the second bit block includes a HARQ-ACK corresponding to the second signaling.

As an example, the second signaling indicates the second index. The second bit block includes a HARQ-ACK corresponding to the second signaling.

As an example, the second signaling indicates SPS release, and the HARQ-ACK corresponding to the second signaling indicates whether the second signaling is received correctly.

As an example, the first node receives a sixth bit block. The second signaling includes scheduling information for the sixth bit block, and the HARQ-ACK corresponding to the second signaling indicates whether the sixth bit block is correctly received.

As an example, the second signaling indicates semi-static scheduling release, and the second bit block includes information indicating whether the second signaling is received correctly.

As an example, the first node receives the sixth bit block. The second signaling includes scheduling information for the sixth bit block, and the second bit block includes information indicating whether the sixth bit block is correctly received.

As an example, the first node receives first signaling group. The first signaling group includes the first signaling. All signaling in the first signaling group indicates the first index. The first bit block includes a first bit sub-block group. A bit sub-block in the first bit sub-block group indicates whether a signaling in the first signaling group or a bit block scheduled by a signaling in the first signaling group is received correctly.

As an example, the first node receives first signaling group. The first signaling group includes the first signaling. All signaling in the first signaling group indicates the first index. The first bit block includes a first bit sub-block group. The first signaling group includes i signaling. The first bit sub-block group includes i bit sub-blocks. An i-th bit sub-block in the first bit sub-block group indicates whether an i-th signaling in the first signaling group or a bit block scheduled by the i-th signaling in the first signaling group is correctly received, where i is a positive integer.

As an example, the first signaling is a last signaling in the first signaling group.

As an example, the first signaling is a signaling, in the first signaling group, monitored on a serving cell having a largest serving cell index in a last PDCCH monitoring occasion.

As an example, the first node receives second signaling group. The second signaling set includes the second signaling. All signaling in the second signaling group indicates the second index. The second bit block includes a second bit sub-block group. A bit sub-block in the second bit sub-block group indicates whether a signaling in the second signaling group or a bit block scheduled by a signaling in the second signaling group has been correctly received.

As an example, the first node receives second signaling group. The second signaling group includes the second signaling. All signaling in the second signaling group indicates the second index. The second bit block includes a second bit sub-block group. The second signaling group includes i signaling. The second bit sub-block group includes i bit sub-blocks. An i-th bit sub-block in the second bit sub-block group indicates whether an i-th signaling in the second signaling group or a bit block scheduled by the i-th signaling in the second signaling group is correctly received, where i is a positive integer.

As an example, the second signaling is a last signaling in the second signaling group.

As an example, the second signaling is a signaling, in the second signaling set, monitored on a serving cell having a largest serving cell index in a last PDCCH monitoring occasion.

As an example, when the target index is a first index, the fourth bit block is an output after the second bit block is subjected to a second operation, the number of bits included in the fourth bit block is not less than the number of bits included in the second bit block. When the target index is the second index, the number of bits included in the third bit block is not greater than the number of bits included in the first bit block.

As an example, the first node uses at least one of the first bit block, the second bit block, and the first signaling, or the second signaling to determine whether the target index is the first index or the second index.

As an example, the total number of bits included in the third bit block and bits included in the fourth bit block, and either the first signaling or the second signaling are used together to determine the target air-interface resource block.

As an example, the first information is higher layer signaling.

As an example, the first information includes one or more fields in RRC signaling.

As an example, the first information includes one or more fields in a MAC CE signaling.

As an example, the first information includes one or more fields in an IE.

As an example, the first information is configuration information indicated by higher layer signaling.

As an example, the first information includes configuration information indicated by RRC signaling.

As an example, the first information includes configuration information indicated by MAC CE signaling.

As an example, the first information includes configuration information indicated by one or more fields in an IE.

As an example, the first information is information indicated by one or more higher layer parameters.

As an example, the first information explicitly indicates that the first signaling includes a first field.

As an example, the first information implicitly indicates that the first signaling includes the first field.

As an example, the first field is a field in DCI.

As an example, the first field includes at least one bit.

As an example, the first field is a frequency hopping flag field.

As an example, the first field is a second downlink assignment index field.

As an example, the first field is a field of precoding information and number of layers.

As an example, the first field is a CBG transmission information (CBGTI) field.

As an example, the first field is a priority indicator field.

Embodiment 2

Figure 2:
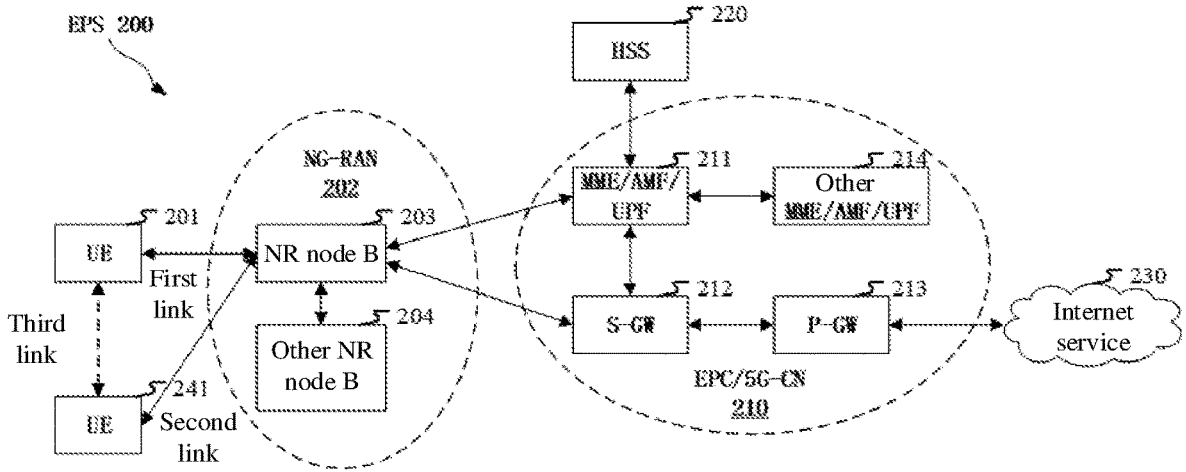
FIG. 2 shows a schematic diagram of a network architecture according to an embodiment of the present disclosure.

As illustrated in FIG. 2, Embodiment 2 illustrates a schematic diagram of a network architecture according to one embodiment of the present disclosure.

FIG. 2 illustrates a diagram of a network architecture 200 for a 5G NR system, a long-term evolution (LTE) system, an LTE-advanced (LTE-A) system. The network architecture 200 for 5G NR or LTE may be referred to as some other suitable term, such as an evolved packet system (EPS) 200. The EPS 200 may include at least one user equipment (UE) 201, a next generation radio access network (NG-RAN) 202, evolved packet core (EPC)/5G-corenetwork (5G-CN) 210, a home subscriber server (HSS) 220, and an Internet service 230. The EPS may be interconnected with other access networks but these entities/interfaces are not shown for simplicity. As shown, the EPS provides packet-switching services. However, those skilled in the art would readily appreciate that various concepts presented throughout the present disclosure can be extended to networks providing circuit-switching services or other cellular networks. The NG-RAN 202 includes an NR node B (gNB) 203 and other gNB s 204. The gNB 203 provides user and control plane protocol termination towards the UE 201. The gNB 203 may be connected to other gNB s 204 via an Xn interface (e.g., backhaul). The gNB 203 may also be referred to as a base station, a base transceiver station, a radio base station, a radio transceiver, a transceiver function, a basic service set (BSS), an extended service set (ESS), a transmitter receiver point (TRP), or some other suitable terms. The gNB 203 provides an access point for the UE 201 to the EPC/5G-CN 210. Instances of UE 201 include a cellular phone, a smart phone, a session initiation protocol (SIP) phone, a laptop computer, a personal digital assistant (PDA), a satellite radio, a non-terrestrial base station communication, satellite mobile communication, a global positioning system, a multimedia device, a video device, a digital audio player (e.g. MP3 player), a camera, a game console, an unmanned aerial vehicles, an aircraft, a narrowband Internet of Things devices, a machine-type communication devices, land vehicles, automobiles, wearable devices, or any other similar functional devices. It shall be understood that the UE 201 may also be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or other suitable terms. The gNB 203 is connected to the EPC/5G-CN 210 via the S1 interface. The EPC/5G-CN 210 includes mobility management entity (MME)/authentication management field (AMF)/user plane function (UPF) 211, other MMEs/AMFs/UPFs 214, a service gateway (S-GW) 212, and a packet date network gateway (P-GW) 213. The MME/AMF/UPF 211 is a control node that processes signaling between the UE 201 and the EPC/5G-CN 210. In general, the MME/AMF/UPF 211 provides bearer and connection management. All user internet protocol (IP) packets are transmitted through the S-GW 212, and the S-GW 212 is connected to the P-GW 213. The P-GW 213 provides IP address assignment for UEs and other functions. The P-GW 213 is connected to the Internet service 230. The Internet service 230 includes operator-corresponding Internet protocol services, and may specifically include Internet, Intranet, IP multimedia subsystem (IMS), and packet-switching streaming services.

As an example, the UE 201 corresponds to the first node in the present disclosure.

As an example, the UE 241 corresponds to the second node in the present disclosure.

As an example the gNB 203 corresponds to the second node in the present disclosure.

As an example, the UE 241 corresponds to the first node in the present disclosure.

As an example, the UE 201 corresponds to the second node in the present disclosure.

Embodiment 3

Figure 3:
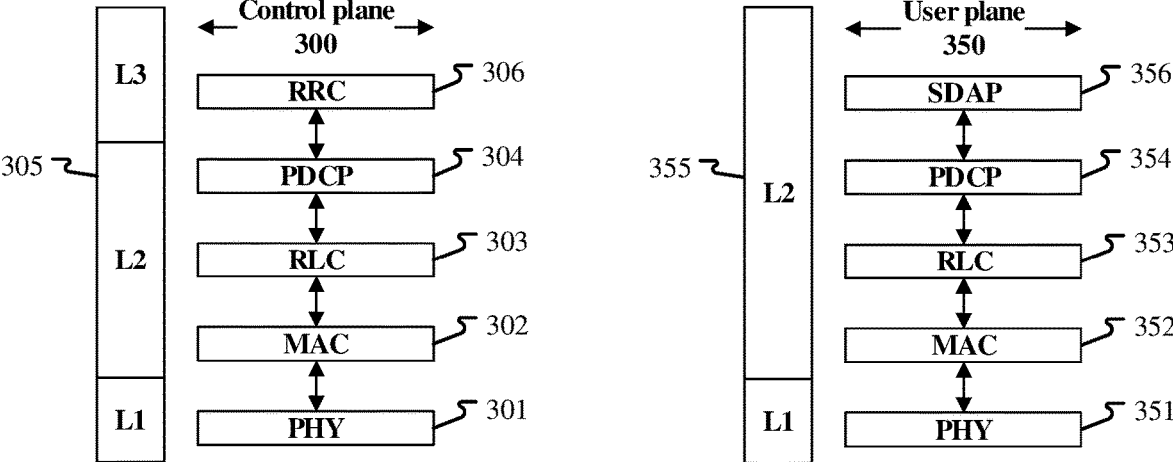
FIG. 3 shows a schematic diagram of a wireless protocol architecture of a user plane and a control plane according to an embodiment of the present disclosure.

As shown in FIG. 3, Embodiment 3 illustrates a schematic diagram of an embodiment of a wireless protocol architecture of a user plane and a control plane according to an embodiment of the present disclosure.

FIG. 3 illustrates a schematic diagram of an embodiment of a wireless protocol architecture of a user plane 350 and a control plane 300 according to an embodiment of the present disclosure. In FIG. 3, a wireless protocol architecture for a control plane 300 between a communication node device (UE, gNB, or a Road Side Unit (RSU) in vehicle to everything (V2X)) and a communication node device (gNB, UE, or RSU in V2X), or the control plane 300 between two UEs includes three layers: Layer 1, Layer 2, and Layer 3. Layer 1 (L1 layer) is a lowest layer and is configured for implementing various physical layer (PHY) signal processing functions. The L1 layer may be called PHY 301 in the present disclosure. Layer 2 (L2 layer) 305 is above the PHY 301 and is responsible for the link between the first communication node device and the second communication node device and the two UEs through the PHY 301. The L2 layer 305 includes a medium access control (MAC) sublayer 302, a radio link control (RLC) sublayer 303, and a packet data convergence protocol (PDCP) sublayer 304, which are terminated at the second communication node device. The PDCP sublayer 304 provides multiplexing between different radio bearers and logical channels. The PDCP sublayer 304 also provides security by encrypting data packets and provides handover support for the first communication node device between second communication node devices. The RLC sublayer 303 provides segmentation and reassembly of upper layer packets, retransmission of lost packets, and reordering of packets to compensate for out-of-order reception due to HARQ. The MAC sublayer 302 provides multiplexing between logical channel and transport channel. The MAC sublayer 302 is also responsible for allocating various radio resources (e.g., resource blocks) in a cell between the first communication node devices. The MAC sublayer 302 is also responsible for the HARQ operation. The radio resource control (RRC) sublayer 306 in Layer 3 (L3 layer) in the control plane 300 is responsible for obtaining radio resources (i.e., radio bearer) and configuring lower layers using RRC signaling between the second communication node device and the first communication node device. The wireless protocol architecture of the user plane 350 includes Layer 1 (L1 layer) and Layer 2 (L2 layer). For the wireless protocol architecture for the first communication node device and the second communication node device, the function of the physical layer 351, a PDCP sublayer 354 in the L2 layer 355, a RLC sublayer 353 in the L2 layer 355, and a MAC sublayer 352 in the L2 layer 355 in the user plane 350 are substantially the same as that of corresponding layers and sublayers in the control plane 300, but the PDCP sublayer 354 in the user plane 350 also provides header compression for upper layer packets to reduce radio transmission overhead. The L2 layer 355 in the user plane 350 further includes a service data adaptation protocol (SDAP) sublayer 356, and the SDAP sublayer 356 is responsible for mapping between quality of service (QoS) flows and data radio bearers (DRBs) to support the diversity of services. Although not illustrated, the first communication node device may have several upper layers above the L2 layer 355, including a network layer (e.g., IP layer) terminating at the P-GW on a network side and an application layer terminating at the other end (e.g., remote UE, server, etc.) of connection.

As an example, the wireless protocol architecture of FIG. 3 is applicable to the first node in the present disclosure.

As an example, the wireless protocol architecture of FIG. 3 is applicable to the second node in the present disclosure.

As an example, the first bit block in the disclosure is generated at the RRC sublayer 306.

As an example, the first bit block in the disclosure is generated at the MAC sublayer 302.

As an example, the first bit block in the disclosure is generated at the MAC sublayer 352.

As an example, the first bit block in the disclosure is generated at the PHY 301.

As an example, the first bit block in the disclosure is generated at the PHY 351.

As an example, the second bit block in the disclosure is generated at the RRC sublayer 306.

As an example, the second bit block in the disclosure is generated at the MAC sublayer 302.

As an example, the second bit block in the disclosure is generated at the MAC sublayer 352.

As an example, the second bit block in the disclosure is generated at the PHY 301.

As an example, the second bit block in the disclosure is generated at the PHY 351.

As an example, the third bit block in the disclosure is generated at the RRC sublayer 306.

As an example, the third bit block in the disclosure is generated at the MAC sublayer 302.

As an example, the third bit block in the disclosure is generated at the MAC sublayer 352.

As an example, the third bit block in the disclosure is generated at the PHY 301.

As an example, the third bit block in the disclosure is generated at the PHY 351.

As an example, the fourth bit block in the disclosure is generated at the RRC sublayer 306.

As an example, the fourth bit block in the disclosure is generated at the MAC sublayer 302.

As an example, the fourth bit block in the disclosure is generated at the MAC sublayer 352.

As an example, the fourth bit block in the disclosure is generated at the PHY 301.

As an example, the fourth bit block in the disclosure is generated at the PHY 351.

As an example, the first signaling in the disclosure is generated at the RRC sublayer 306.

As an example, the first signaling in the disclosure is generated at the MAC sublayer 302.

As an example, the first signaling in the disclosure is generated at the MAC sublayer 352.

As an example, the first signaling in the disclosure is generated at the PHY 301.

As an example, the first signaling in the disclosure is generated at the PHY 351.

As an example, the second signaling in the disclosure is generated at the RRC sublayer 306.

As an example, the second signaling in the disclosure is generated at the MAC sublayer 302.

As an example, the second signaling in the disclosure is generated at the MAC sublayer 352.

As an example, the second signaling in the disclosure is generated at the PHY 301.

As an example, the second signaling in the disclosure is generated at the PHY 351.

Embodiment 4

Figure 4:
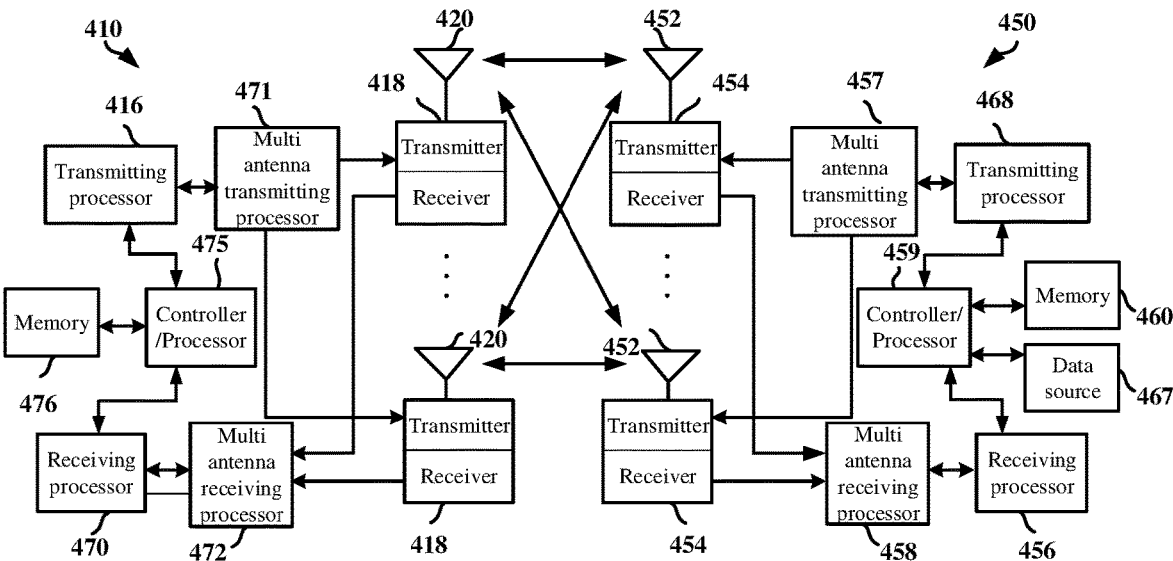
FIG. 4 shows a schematic diagram of a first communication device and a second communication device according to an embodiment of the present disclosure.

As shown in FIG. 4, Embodiment 4 illustrates a schematic diagram of a first communication device and a second communication device according to an embodiment of the present disclosure. FIG. 4 is a block diagram of a first communication device 410 and a second communication device 450 communicating with each other in an access network.

The first communication device 410 includes a controller/processor 475, a memory 476, a reception processor 470, a transmit processor 416, a multi-antenna reception processor 472, a multi-antenna transmit processor 471, a transmitter/receiver 418, and at least one antenna 420.

The second communication device 450 includes a controller/processor 459, a memory 460, a data source 467, a transmit processor 468, a reception processor 456, a multi-antenna transmit processor 457, a multi-antenna reception processor 458, a transmitter/receiver 454, and at least one antenna 452.

In transmission from the first communication device 410 to the second communication device 450, at the first communication device 410, upper layer packets from a core network are provided to the controller/processor 475. The controller/processor 475 implements the functionality of the L2 layer. In transmission from the first communication device 410 to the second communication device 450, the controller/processor 475 provides header compression, encryption, packet segmentation and reordering, multiplexing between logical channel and transmission channel, and radio resource allocation to the second communication device 450 based on various priority metrics. The controller/processor 475 is also responsible for retransmission of lost packets, and signaling to the second communication device 450. The transmit processor 416 and the multi-antenna transmit processor 471 implement various signal processing functions for the L1 layer (i.e., the physical layer). The transmit processor 416 implements encoding and interleaving to facilitate forward error correction (FEC) at the second communication device 450 and mapping of signal clusters based on various modulation schemes (e.g., binary phase shift keying (BPSK), quadrature phase shift keying (QPSK), multiple phase shift keying (M-PSK), multiple quadrature amplitude modulation (M-QAM)). The multi-antenna transmit processor 471 performs digital spatial pre-coding, including codebook-based and non-codebook-based pre-coding, and beamforming on encoded and modulated symbols to generate one or more parallel streams. The transmit processor 416 then maps each parallel stream to sub-carriers, multiplexes the modulated symbols with reference signals (e.g., pilots) in time domain and/or frequency domain, and then performs inverse fast Fourier transform (IFFT) to generate a physical channel carrying time domain multi-carrier symbol streams. The multi-antenna transmit processor 471 then performs a transmit analog pre-coding/beamforming operation on the time domain multi-carrier symbol streams. Each transmitter 418 converts a baseband multi-carrier symbol stream provided by the multi-antenna transmit processor 471 into a RF stream to be provided to different antennas 420.

In transmission from the first communication device 410 to the second communication device 450, at the second communication device 450, each receiver 454 receives signals through a corresponding antenna 452. Each receiver 454 recovers information modulated onto a RF carrier and converts the RF stream into a baseband multi-carrier symbol stream for provision to a reception processor 456. The reception processor 456 and the multi-antenna reception processor 458 implement various signal processing functions of the L1 layer. The multi-antenna reception processor 458 performs a receive analog pre-coding/beamforming operation on the baseband multi-carrier symbol stream from the receiver 454. The reception processor 456 performs fast Fourier transform (FFT) to convert the received baseband multi-carrier symbol stream subjected to the receive analog pre-coding/beamforming operation from the time domain to the frequency domain. In the frequency domain, data signal and the reference signal of the physical layer are demultiplexed by the reception processor 456, where the reference signal is to be used for channel estimation, and any parallel stream destined for the second communication device 450 is recovered from the data signal after being detected by multiple antennas in the multi-antenna reception processor 458. Symbols on each parallel stream are demodulated and recovered in the reception processor 456 to generate a soft decision. Thereafter, the reception processor 456 decodes and deinterleaves the soft decision to recover upper layer data and control signals transmitted by the first communication device 410 on the physical channel. The upper layer data and the control signals are then provided to the controller/processor 459. The controller/processor 459 implements functions of the L2 layer. The controller/processor 459 may be associated with the memory 460 that stores program code and data. The memory 460 may be referred to as a computer-readable medium. In the transmission from the first communication device 410 to the second communication device 450, the controller/processor 459 provides multiplexing between transmission and logical channels, packet reassembly, decryption, header decompression, and control signal processing to recover upper layer packets from the core network. The upper layer packets are then provided to all protocol layers above the L2 layer. Alternatively, various control signals may also be provided to L3 layer for L3 processing.

In transmission from the second communication device 450 to the first communication device 410, at the second communication device 450, the upper layer packets are provided from the data source 467 to the controller/processor 459. The data source 467 represents all protocol layers above the L2 layer Similar to the transmission function at the first communication device 410 described in the transmission from the first communication device 410 to the second communication device 450, the controller/processor 459 implements header compression, encryption, packet segmentation and reordering, and multiplexing between logical channel and transmission channel based on radio resource allocation, thereby implementing L2 layer functions for the user plane and the control plane. The controller/processor 459 is also responsible for retransmission of lost packets, and signaling to the first communication device 410. The transmit processor 468 performs modulation mapping and channel encoding processing. The multi-antenna transmit processor 457 performs digital multi-antenna spatial pre-coding, including codebook-based pre-coding and non-codebook-based pre-coding, and beamforming processing. The transmit processor 468 then modulates the generated parallel streams into a multi-carrier/single-carrier symbol stream, and the multi-carrier/single-carrier symbol stream is subjected to analog pre-coding/beamforming in the multi-antenna transmit processor 457 and then provided by the transmitter 454 to different antennas 452. Each transmitter 454 first converts baseband symbol streams provided by the multi-antenna transmit processor 457 into a RF symbol stream to be provided to the antenna 452.

In the transmission from the second communication device 450 to the first communication device 410, the function at the first communication device 410 is similar to the reception function at the second communication device 450 described in the transmission from the first communication device 410 to the second communication device 450.

Each receiver 418 receives a RF signal through a corresponding antenna 420, converts the received RF signal into a baseband signal, and provides the baseband signal to the multi-antenna reception processor 472 and the reception processor 470. The reception processor 470 and the multi-antenna reception processor 472 jointly implement the functions of the L1 layer. The controller/processor 475 implements the functions of the L2 layer. The controller/processor 475 may be associated with the memory 476 that stores program code and data. The memory 476 may be referred to as a computer-readable medium. In the transmission from the second communication device 450 to the first communication device 410, the controller/processor 475 provides multiplexing between transmission and logical channels, packet reassembly, decryption, header decompression, and control signal processing to recover upper layer packets from the UE 450. The upper layer packets from the controller/processor 475 may be provided to the core network.

As an example, the first node in the present disclosure includes the second communication device 450 and the second node in the present disclosure includes the first communication device 410.

In the above example, the first node is a user equipment and the second node is a user equipment.

In the above example, the first node is a user equipment and the second node is a relay node.

In the above example, the first node is a relay node and the second node is a user equipment.

In the above example, the first node is a user equipment and the second node is a base station device.

In the above example, the first node is a relay node and the second node is a base station device.

In the above example, the second communication device 450 includes at least one controller/processor. The at least one controller/processor is responsible for HARQ operation.

In the above example, the first communication device 410 includes at least one controller/processor. The at least one controller/processor is responsible for HARQ operation.

In the above example, the first communication device 410 includes at least one controller/processor. The at least one controller/processor is responsible for error detection using ACK and/or NACK protocols to support the HARQ operation.

As an example, the second communication device 450 includes at least one processor and at least one memory each including a computer program code. The at least one memory and at least one computer program code are configured for use with the at least one processor. The second communication device 450 at least performs: receiving first information in the present disclosure; receiving first signaling in the present disclosure and second signaling in the present disclosure; transmitting a first signal of the present disclosure in a target air-interface resource block of the present disclosure, the first signal carrying a third bit block of the present disclosure and a fourth bit block of the present disclosure; where the first information indicates that the first signaling includes the first field in the present disclosure; the first signaling is used to determine a first bit block in the present disclosure; the second signaling is used to determine a second bit block in the present disclosure; the first bit block is used to generate the third bit block; the second bit block is used to generate the fourth bit block; an output after all bits in the third bit block and all bits in the fourth bit block are subjected to a first channel coding of the present disclosure is configured for generating the first signal; the target air-interface resource block corresponds to the target index in the disclosure, the target index is equal to the first index in the disclosure, the target index is equal to the first index in the disclosure or the second index in the disclosure, and the first index is not equal to the second index; when the target index is equal to the first index, the third bit block is the first bit block, and the fourth bit block is the second bit block or an output obtained after the second bit block is subjected to the second operation in the present disclosure; when the target index is equal to the second index, the third bit block is an output obtained after the first bit block is subjected to the first operation in the disclosure, and the fourth bit block is the second bit block; the first bit block corresponds to the first index, and the second bit block corresponds to the second index.

In the above example, the second communication device 450 corresponds to the first node in the present disclosure.

As an example, the second communication device 450 includes: a memory storing a computer-readable instruction program that generates actions when executed by at least one processor, the actions including: receiving first information in the present disclosure; receiving first signaling in the present disclosure and second signaling in the present disclosure; transmitting the first signal of the present disclosure in the target air-interface resource block of the present disclosure, the first signal carrying the third bit block of the present disclosure and the fourth bit block of the present disclosure; where the first information indicates that the first signaling includes the first field in the present disclosure; the first signaling is used to determine the first bit block in the present disclosure; the second signaling is used to determine the second bit block in the present disclosure; the first bit block is used to generate the third bit block; the second bit block is used to generate the fourth bit block; an output after all bits in the third bit block and all bits in the fourth bit block are subjected to a first channel coding of the present disclosure is configured for generating the first signal; the target air-interface resource block corresponds to the target index in the disclosure, the target index is equal to the first index in the disclosure or the second index in the disclosure, and the first index is not equal to the second index; when the target index is equal to the first index, the third bit block is the first bit block, and the fourth bit block is the second bit block or an output obtained after the second bit block is subjected to the second operation in the present disclosure; when the target index is equal to the second index, the third bit block is the output obtained after the first bit block is subjected to the first operation in the disclosure, and the fourth bit block is the second bit block; the first bit block corresponds to the first index, and the second bit block corresponds to the second index.

In the above example, the second communication device 450 corresponds to the first node in the present disclosure.

As an example, the first communication device 410 includes at least one processor and at least one memory, each of the at least one memory including a computer program code; the at least one memory and the at least one computer program code are configured for use with the at least one processor. The first communication device 410 at least performs: transmitting the first information in the present disclosure; transmitting the first signaling in the present disclosure and the second signaling in the present disclosure; receiving the first signal of the present disclosure in the target air-interface resource block of the present disclosure, the first signal carrying the third bit block of the present disclosure and the fourth bit block of the present disclosure; where the first information indicates that the first signaling includes the first field in the present disclosure; the first signaling is used to determine the first bit block in the present disclosure; the second signaling is used to determine the second bit block in the present disclosure; the first bit block is used to generate the third bit block; the second bit block is used to generate the fourth bit block; all bits in the third bit block and all bits in the fourth bit block are subjected to a first channel coding of the present disclosure is configured for generating the first signal; the target air-interface resource block corresponds to the target index in the disclosure, the target index is equal to the first index in the disclosure or the second index in the disclosure, and the first index is not equal to the second index; when the target index is equal to the first index, the third bit block is the first bit block, and the fourth bit block is the second bit block or the output obtained after the second bit block is subjected to the second operation in the present disclosure; when the target index is equal to the second index, the third bit block is the output obtained after the first bit block is subjected to the first operation in the disclosure, and the fourth bit block is the second bit block; the first bit block corresponds to the first index, and the second bit block corresponds to the second index.

In the above example, the first communication device 410 corresponds to the second node in the present disclosure.

As an example, the first communication device 410 includes: a memory storing a computer-readable instruction program that generates actions when executed by at least one processor, the actions including: transmitting the first information of the present disclosure; transmitting the first signaling in the present disclosure and the second signaling in the present disclosure; receiving the first signal of the present disclosure in the target air-interface resource block of the present disclosure, the first signal carrying the third bit block of the present disclosure and the fourth bit block of the present disclosure; where the first information indicates that the first signaling includes the first field in the present disclosure; the first signaling is used to determine the first bit block in the present disclosure; the second signaling is used to determine the second bit block in the present disclosure; the first bit block is used to generate the third bit block; the second bit block is used to generate the fourth bit block; all bits in the third bit block and all bits in the fourth bit block are subjected to a first channel coding of the present disclosure is configured for generating the first signal; the target air-interface resource block corresponds to the target index in the disclosure, the target index is equal to the first index in the disclosure or the second index in the disclosure, and the first index is not equal to the second index; when the target index is equal to the first index, the third bit block is the first bit block, and the fourth bit block is the second bit block or the output obtained after the second bit block is subjected to the second operation in the present disclosure; when the target index is equal to the second index, the third bit block is the output obtained after the first bit block is subjected to the first operation in the disclosure, and the fourth bit block is the second bit block; the first bit block corresponds to the first index, and the second bit block corresponds to the second index.

In the above example, the first communication device 410 corresponds to the second node in the present disclosure.

As an example, at least one of the antenna 452, the receiver 454, the multi-antenna reception processor 458, the reception processor 456, the controller/processor 459, the memory 460, and the data source 467 is used to receive the first signaling in the present disclosure.

At least one of the antenna 420, the transmitter 418, the multi-antenna transmit processor 471, the transmit processor 416, the controller/processor 475, and the memory 476 is used to transmit the first signaling in the present disclosure.

As an example, at least one of the antenna 452, the receiver 454, the multi-antenna reception processor 458, the reception processor 456, the controller/processor 459, the memory 460, and the data source 467 is used to receive the second signaling in the present disclosure.

At least one of the antenna 420, the transmitter 418, the multi-antenna transmit processor 471, the transmit processor 416, the controller/processor 475, and the memory 476 is used to transmit the second signaling in the present disclosure.

At least one of the antenna 452, the transmitter 454, the multi-antenna transmit processor 458, the transmit processor 468, the controller/processor 459, the memory 460, and the data source 467 is used to transmit the first signal in the target air-interface resource block in the present disclosure.

As an example, at least one of the antenna 420, the receiver 418, the multi-antenna reception processor 472, the reception processor 470, the controller/processor 475, and the memory 476 is used to receive the first signal in the target air-interface resource block in the present disclosure.

Embodiment 5

Figure 5:
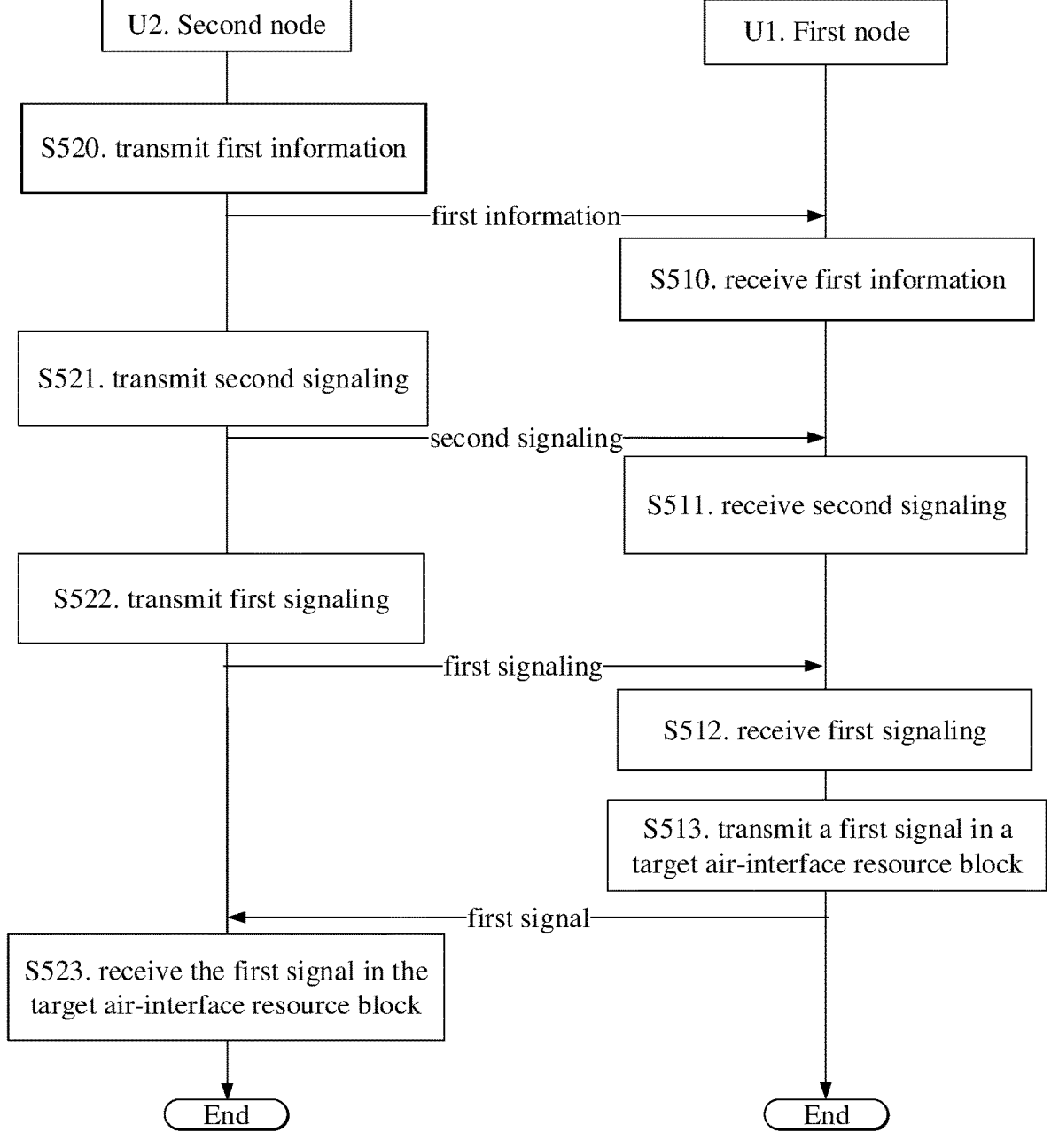
FIG. 5 shows a flow chart of signal transmission according to an embodiment of the present disclosure.

As shown in FIG. 5, Embodiment 5 is a flow chart of a wireless signal transmission according to an embodiment of the present disclosure. In FIG. 5, a first node U1 and a second node U2 are communicated with each other via an air-interface. In particular, the sequence between the two operations at S521 and S511 and the two operations at S522 and S512 in FIG. 5 does not represent a specific time domain relationship.

The first node U1 receives first information at S510; receives second signaling at S511; receives first signaling at S512; and transmits a first signal in a target air-interface resource block at S513.

The second node U2 transmits the first information at S520; transmits second signaling at S521; transmits first signaling at S522; and receives the first signal in the target air-interface resource block at S523.

In Embodiment 5, the first signal carries a third bit block and a fourth bit block. The first information indicates that the first signaling includes a first field. The first signaling is used to determine a first bit block. The second signaling is used to determine a second bit block. The first bit block is used to generate the third bit block. The second bit block is used to generate the fourth bit block. An output obtained after all bits in the third bit block and all bits in the fourth bit block are subjected to a first channel coding is used to generate the first signal. The target air-interface resource block corresponds to a target index, the target index is equal to a first index or a second index, and the first index is not equal to the second index. When the target index is equal to the first index, the third bit block is the first bit block, and the fourth bit block is the second bit block or the output obtained after the second bit block is subjected to a second operation. When the target index is equal to the second index, the third bit block is the output obtained after the first bit block is subjected to the first operation, and the fourth bit block is the second bit block. The first bit block corresponds to the first index, and the second bit block corresponds to the second index. The first bit block includes a first type of HARQ-ACK. The second bit block includes a second type of HARQ-ACK. The first type of HARQ-ACK is different from the second type of HARQ-ACK. The first type of HARQ-ACK corresponds to the first index. The second type of HARQ-ACK corresponds to the second index. The first signaling indicates the first index. The second signaling indicates the second index. When the target index is the first index, the number of bits included in the fourth bit block is not greater than the number of bits included in the second bit block. When the target index is the second index, the number of bits included in the third bit block is not less than the number of bits included in the first bit block. When the target index is the first index, the first signaling indicates the target air-interface resource block from a first air-interface resource block set. When the target index is the second index, the second signaling indicates the target air-interface resource block from a second air-interface resource block set. The first operation includes a second encoding. The second operation includes at least one of a logical AND, a logical OR, an exclusive OR, and a bit-deleting operation.

As a sub-embodiment of Embodiment 5, at least one of the number of bits included in the first bit block and the number of bits included in the second bit block is used to determine the target index.

As a sub-embodiment of Embodiment 5, the first signaling is used to determine a first air-interface resource block. The second signaling is used to determine a second air-interface resource block. A relative positional relationship of the first air-interface resource block and the second air-interface resource in the time domain is used to determine whether the target index is the first index or the second index.

As an example, the first node U1 is the first node in this disclosure.

As an example, the second node U2 is the second node in this disclosure.

As an example, the first node U1 is a UE.

As an example, the second node U2 is a base station.

As an example, the second node U2 is a UE.

As an example, the air-interface between the second node U2 and the first node U1 is a Uu interface.

As an example, the air-interface between the second node U2 and the first node U1 includes a cellular link.

As an example, the air-interface between the second node U2 and the first node U1 is a PC5 interface.

As an example, the air-interface between the second node U2 and the first node U1 includes a sidelink.

As an example, the air-interface between the second node U2 and the first node U1 includes a wireless interface between the base station device and the user equipment.

As an example, the first signaling includes a priority indicator field. The priority indicator field in the first signaling indicates the first index.

As an example, the second signaling includes a priority indicator field. The priority indicator field in the second signaling indicates the second index.

As an example, a signaling format of the first signaling implicitly indicates the first index.

As an example, a signaling format of the second signaling implicitly indicates the second index.

As an example, a radio network temporary identity (RNTI) of the first signaling implicitly indicates the first index.

As an example, a RNTI of the second signaling implicitly indicates the second index.

As an example, all HARQ-ACKs included in the first bit block have a same priority.

As an example, all HARQ-ACKs included in the first bit block have a same service type.

As an example, the first bit block includes only HARQ-ACK.

As an example, the first bit block includes information indicating whether the first signaling is received correctly.

As an example, the first bit block includes information indicating whether a bit block scheduled by the first signaling is correctly received.

As an example, all HARQ-ACKs included in the second bit block have a same priority.

As an example, all HARQ-ACKs included in the second bit block have a same service type.

As an example, the second bit block includes only HARQ-ACK.

As an example, the second bit block further includes UCI other than HARQ-ACK.

As an example, the second bit block includes information indicating whether the second signaling is received correctly.

As an example, the second bit block includes information indicating whether a bit block scheduled by the second signaling is correctly received.

Embodiment 6

Figure 6:
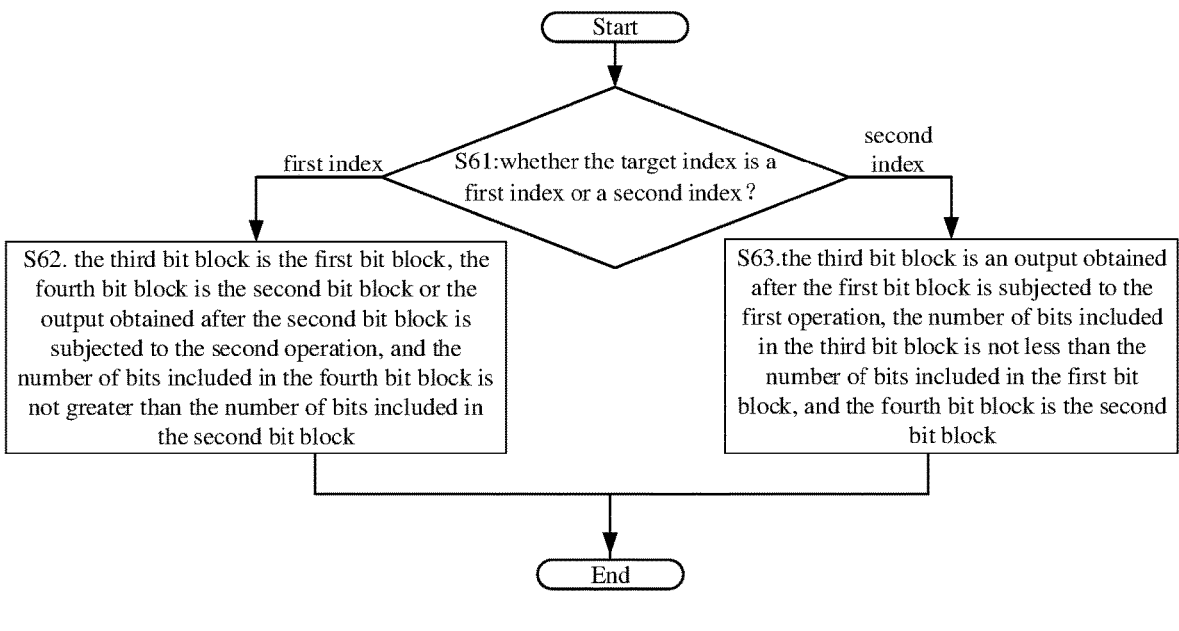
FIG. 6 shows a schematic flow chart of determining a third bit block and a fourth bit block according to an embodiment of the present disclosure.

As shown in FIG. 6, Embodiment 6 illustrates a schematic flow chart of determining a third bit block and a fourth bit block according to an embodiment of the present disclosure.

In Embodiment 6, the first node in the present disclosure judges whether the target index is a first index or a second index at S61. If the target index is the first index, the method proceeds to operations at S62 to determine that the third bit block is the first bit block, the fourth bit block is the second bit block or the output obtained after the second bit block is subjected to the second operation, and the number of bits included in the fourth bit block is not greater than the number of bits included in the second bit block. If the target index is the second index, the method proceeds to operations at S63 to determine that the third bit block is an output obtained after the first bit block is subjected to the first operation, the number of bits included in the third bit block is not less than the number of bits included in the first bit block, and the fourth bit block is the second bit block.

As an example, the first operation includes a second encoding.

As an example, the second operation includes one or more of a logical AND, a logical OR, an exclusive OR, and a bit-deleting operation.

As an example, the second operation includes a second encoding.

As an example, the first operation includes one or more of a logical AND, a logical OR, an exclusive OR, or a bit-deleting operation.

As an example, the second encoding includes a channel coding.

As an example, a coding scheme adopted by the second encoding includes a polar code or a block code.

As an example, the second encoding includes performing a repetition code encoding operation on some or all of the bits included in the second bit block or the first bit block.

As an example, the second encoding includes an operation of generating and adding check bits.

As an example, the first operation includes an operation of generating and adding check bits.

As an example, the expression "the third bit block is an output obtained after the first bit block is subjected to a first operation" includes that: the third bit block is an output after part or all of the bits in the first bit block are subjected to a second encoding.

As an example, the expression "the third bit block is an output obtained after the first bit block is subjected to a first operation" includes that: the third bit block is an output after part of or all bits in the first bit block are subjected to a second encoding. The second encoding includes generating check bits for part of or all bits in the first bit block. The third bit block includes some of or all the check bits.

As an example, the expression "the third bit block is an output obtained after the first bit block is subjected to a first operation" includes that: the third bit block is an output after some or all bits in the first bit block are subjected to the first operation.

As an example, the expression "the fourth bit block is the second bit block or the output obtained after the second bit block is subjected to a second operation" includes that: the fourth bit block is the output obtained after some or all bits in the second bit block are subjected to the second operation.

As an example, the expression "the fourth bit block is the second bit block or the output obtained after the second bit block is subjected to a second operation" includes that: the fourth bit block is the output after part of or all the bits in the second bit block are subjected to a second encoding.

As an example, the expression "the fourth bit block is the second bit block or the output obtained after the second bit block is subjected to a second operation" includes that: the fourth bit block is the second bit block.

As an example, when the target index is the first index, the number of bits included in the fourth bit block is equal to the number of bits included in the second bit block. When the target index is the second index, the number of bits included in the third bit block is greater than the number of bits included in the first bit block.

As an example, when the target index is the first index, the fourth bit block is an output obtained after the second bit block is subjected to the second operation, the number of bits included in the fourth bit block is less than the number of bits included in the second bit block. When the target index is the second index, the number of bits included in the third bit block is greater than the number of bits included in the first bit block.

As an example, when the target index is the first index, the fourth bit block is an output obtained after the second bit block is subjected to the second operation, the number of bits included in the fourth bit block is less than the number of bits included in the second bit block. When the target index is the second index, the number of bits included in the third bit block is equal to the number of bits included in the first bit block.

Embodiment 7

Figure 7:
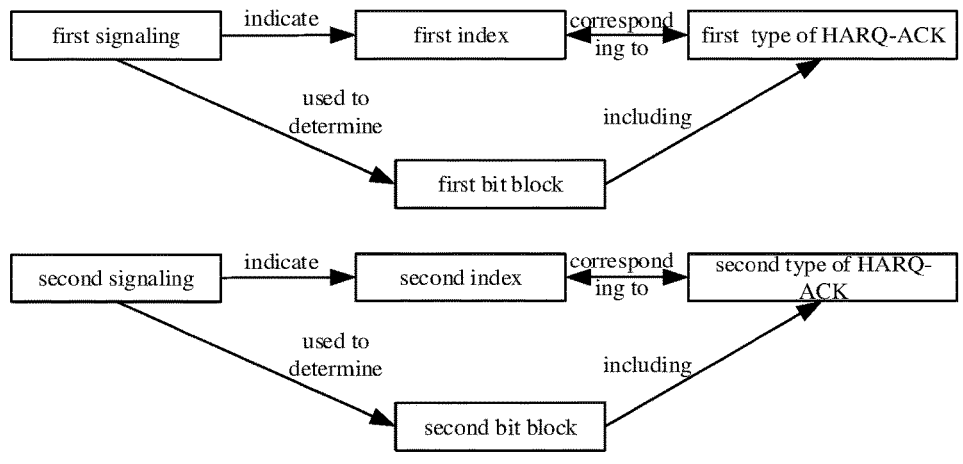
FIG. 7 shows a schematic diagram of a relationship between first signaling, a first index, a first bit block, and a first type of HARQ-ACK, and a relationship between second signaling, a second index, a second bit block, and a second type of HARQ-ACK according to an embodiment of the present disclosure.

As shown in FIG. 7, Embodiment 7 illustrates a schematic diagram of a relationship between first signaling, a first index, a first bit block, and a first type of HARQ-ACK, and a relationship between second signaling, a second index, a second bit block, and a second type of HARQ-ACK according to an embodiment of the present disclosure.

In embodiment 7, first signaling is configured for indicating a first index, and the first signaling is used to determine a first bit block. The first bit block includes a first type of HARQ-ACK, the first type of HARQ-ACK corresponding to the first index. The second signaling is configured for indicating a second index, and the second signaling is used to determine a second bit block. The second bit block includes a second type of HARQ-ACK, and the second type of HARQ-ACK corresponds to the second index.

As an example, the first type of HARQ-ACK is different from the second type of HARQ-ACK.

As an example, the first type of HARQ-ACK includes an ACK or a NACK.

As an example, the second type of HARQ-ACK includes an ACK or a NACK.

As an example, a priority index corresponding to the first type of HARQ-ACK is equal to 1.

As an example, the priority index corresponding to the first type of HARQ-ACK is equal to 0.

As an example, a priority index corresponding to the second type of HARQ-ACK is equal to 1.

As an example, the priority index corresponding to the second type of HARQ-ACK is equal to 0.

As an example, the first type of HARQ-ACK and the second type of HARQ-ACK are HARQ-ACKs of different priorities, respectively.

As an example, the different priorities refer to a high priority and a low priority, respectively.

As an example, the first type of HARQ-ACK and the second type of HARQ-ACK are HARQ-ACKs respectively used for different service types.

As an example, the different service types are URLLC and eMBB, respectively.

As an example, the different service types are services on different links.

As an example, the first type of HARQ-ACK and the second type of HARQ-ACK are HARQ-ACKs corresponding respectively to services with different QoS.

As an example, the first type of HARQ-ACK includes an indication information indicating whether a signaling corresponding to the first index is correctly received.

As an example, the first type of HARQ-ACK includes information indicating whether a first type of bit block is correctly received. Signaling indicating the first index includes scheduling information for the first type of bit block.

As an example, the first type of bit block includes a transport block (TB) of high-priority.

As an example, the first type of bit block includes a TB of low-priority.

As an example, the first type of bit block includes a code block group (CBG) of high-priority.

As an example, the first type of bit block includes a CBG of low-priority.

As an example, the first type of bit block includes a TB of a URLLC service.

As an example, the first type of bit block includes a TB of an eMBB service.

As an example, the second type of HARQ-ACK includes an indication information indicating whether the signaling corresponding to the second index is correctly received.

As an example, the second type HARQ-ACK includes information indicating whether a second type of bit block is correctly received. Signaling indicating the second index includes scheduling information for the second type of bit block.

As an example, the second type of bit block includes a TB of high-priority.

As an example, the second type of bit block includes a TB of low-priority.

As an example, the second type of bit block includes a CBG of high-priority.

As an example, the second type of bit block includes a CBG of low-priority.

As an example, the second type of bit block includes a TB of a URLLC service.

As an example, the second type of bit block includes a TB of an eMBB service.

As an example, the second type of bit block and the first type of bit block are different types of bit blocks.

As an example, the second type of bit block and the first type of bit block are bit blocks of different QoS, respectively.

As an example, the first signaling explicitly indicates the first index.

As an example, the first signaling implicitly indicates the first index.

As an example, a field in the first signaling indicates the first index.

As an example, the second signaling explicitly indicates the second index.

As an example, the second signaling implicitly indicates the second index.

As an example, a field in the second signaling indicates the second index.

Embodiment 8

Figure 8:
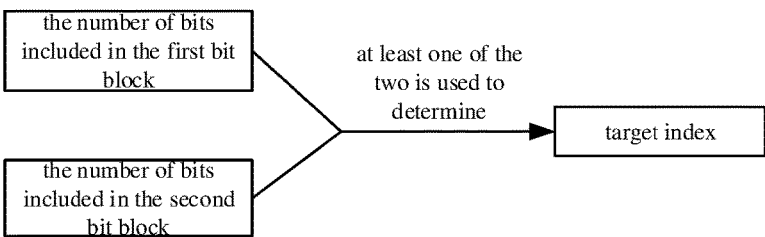
FIG. 8 shows a schematic diagram of a relationship between the number of bits included in a first bit block, the number of bits included in a second bit block, and a target index according to an embodiment of the present disclosure.

As shown in FIG. 8, Embodiment 8 illustrates a schematic diagram of a relationship between the number of bits included in the first bit block, the number of bits included in the second bit block, and the target index according to an embodiment of the present disclosure.

In Embodiment 8, at least one of the number of bits included in the first bit block and the number of bits included in the second bit block is used to determine the target index.

As an example, a size relationship between the number of bits included in the first bit block and the number of bits included in the second bit block is used to determine whether the target index is the first index or the second index.

As an example, a size relationship between the number of bits included in the first bit block and a first threshold is used to determine whether the target index is the first index or the second index. The first threshold is a positive integer.

As an example, a size relationship between the number of bits included in the second bit block and a second threshold is used to determine whether the target index is the first index or the second index. The second threshold is a positive integer.

The target index is the first index when the number of bits included in the first bit block is greater than the number of bits included in the second bit block. The target index is the second index when the number of bits included in the first bit block is not greater than the number of bits included in the second bit block.

As an example, the target index is the first index when the number of bits included in the first bit block is not less than the number of bits included in the second bit block. The target index is the second index when the number of bits included in the first bit block is less than the number of bits included in the second bit block.

As an example, the target index is the second index when the number of bits included in the first bit block is greater than the number of bits included in the second bit block. The target index is the first index when the number of bits included in the first bit block is not greater than the number of bits included in the second bit block.

As an example, the target index is the second index when the number of bits included in the first bit block is not less than the number of bits included in the second bit block. The target index is the first index when the number of bits included in the first bit block is less than the number of bits included in the second bit block.

As an example, the target index is the first index when the number of bits included in the second bit block is greater than a second threshold. The target index is the second index when the number of bits included in the second bit block is not greater than the second threshold. The second threshold is a positive integer.

As an example, the target index is the second index when the number of bits included in the second bit block is greater than a second threshold. The target index is the first index when the number of bits included in the second bit block is not greater than the second threshold. The second threshold is a positive integer.

As an example, the target index is the first index when the number of bits included in the first bit block is greater than a first threshold. The target index is the second index when the number of bits included in the first bit block is not greater than the first threshold. The first threshold is a positive integer.

As an example, the target index is the second index when the number of bits included in the first bit block is greater than a first threshold. The target index is the first index when the number of bits included in the first bit block is not greater than the first threshold. The first threshold is a positive integer.

Embodiment 9

As shown in FIG. 9, Embodiment 9 illustrates a schematic flow chart of determining whether first signaling or second signaling is used to indicate a target air-interface resource block according to an embodiment of the present disclosure.

In Embodiment 9, the first node in the present disclosure judges whether the target index is a first index or a second index at S91. If the target index is the first index, the method proceeds to operations at S92 to determine that: the first signaling indicates a target air-interface resource block from a first air-interface resource block set. If the target index is the second index, the method proceeds to operations at S93 to determine that: the second signaling indicates the target air-interface resource block from a second air-interface resource block set.

As an example, the first air-interface resource block set includes a PUCCH resource set.

As an example, the second air-interface resource block set includes a PUCCH resource set.

As an example, the first air-interface resource block set includes a positive integer number of air-interface resource blocks.

As an example, the second air-interface resource block set includes a positive integer number of air-interface resource blocks.

As an example, the first air-interface resource block set includes a positive integer number of PUCCH resources.

As an example, the second air-interface resource block set includes a positive integer number of PUCCH resources.

As an example, the first air-interface resource block set includes a positive integer number of air-interface resource blocks. The second air-interface resource block set includes a positive integer number of air-interface resource blocks. The positive integer number of air-interface resource blocks included in the first air-interface resource block set and the positive integer number of air-interface resource blocks included in the second air-interface resource block set are reserved for different classes of UCI, respectively.

As an example, the first air-interface resource block set includes a positive integer number of PUCCH resources. The second air-interface resource block set includes a positive integer number of PUCCH resources. The positive integer number of PUCCH resources included in the first air-interface resource block set and the positive integer number of PUCCH resources included in the second air-interface resource block set are reserved for different classes of UCI, respectively.

As an example, the first air-interface resource block set includes a PUCCH reserved for a UCI of high-priority. The second air-interface resource block set includes a PUCCH reserved for a UCI of low-priority.

As an example, the first air-interface resource block set includes a PUCCH reserved for a UCI of low-priority. The second air-interface resource block set includes a PUCCH reserved for a UCI of high-priority.

As an example, the first air-interface resource block set includes a PUCCH reserved for a HARQ-ACK of high-priority. The second air-interface resource block set includes a PUCCH reserved for a HARQ-ACK of low-priority.

As an example, the first air-interface resource block set includes a PUCCH reserved for a HARQ-ACK of low-priority. The second air-interface resource block set includes a PUCCH reserved for a HARQ-ACK of high-priority.

As an example, the first air-interface resource block set includes a PUCCH reserved for a UCI of a URLLC service type. The second air-interface resource block set includes a PUCCH reserved for a UCI of an eMBB service type.

As an example, the first air-interface resource block set includes a PUCCH reserved for UCI of an eMBB service type. The second air-interface resource block set includes a PUCCH reserved for a UCI of a URLLC service type.

As an example, the target index is the first index. The first signaling explicitly indicates the target air-interface resource block from the first air-interface resource block set.

As an example, the target index is the second index. The second signaling explicitly indicates the target air-interface resource block from the second air-interface resource block set.

As an example, the target index is the first index. The first signaling implicitly indicates the target air-interface resource block from the first air-interface resource block set.

As an example, the target index is the second index. The second signaling implicitly indicates the target air-interface resource block from the second air-interface resource block set.

As an example, the target index is the first index. The first signaling implicitly indicates the target air-interface resource block from the first air-interface resource block set. A value indicated by a field in the first signaling is equal to an index of the target air-interface resource block in the first air-interface resource block set.

As an example, the target index is the second index. The second signaling implicitly indicates the target air-interface resource block from the second air-interface resource block set. A value indicated by a field in the second signaling is equal to an index of the target air-interface resource block in the second air-interface resource block set.

As an example, the total number of bits included in the third bit block and bits included in the fourth bit block, and either the first signaling or the second signaling are used together to determine the target air-interface resource block.

As an example, the target index is the first index. N1 numerical value ranges correspond, respectively, to N1 air-interface resource block sets. A first numerical value range is one of the N1 numerical value ranges. The first air-interface resource block set is an air-interface resource block set, among the N1 air-interface resource block sets, corresponding to the first numerical value range. The sum of the number of bits included in the third bit block and the number of bits included in the fourth bit block is equal to a numerical value in the first numerical value range. The first signaling indicates the target air-interface resource block from the first air-interface resource block set.

As an example, the target index is the second index. N2 numerical value ranges correspond, respectively, to N2 air-interface resource block sets. A second numerical value range is one of the N2 numerical value ranges. The second air-interface resource block set is an air-interface resource block set, among the N2 air-interface resource block sets, corresponding to the second numerical value range. The sum of the number of bits included in the third bit block and the number of bits included in the fourth bit block is equal to a numerical value in the second numerical value range. The second signaling indicates the target air-interface resource block from the second air-interface resource block set.

As an example, N1 air-interface resource block sets include N1 PUCCH resource sets.

As an example, N2 air-interface resource block sets include N2 PUCCH resource sets.

As an example, N1 is a positive integer.

As an example, N2 is a positive integer.

As an example, N1 is equal to 1.

As an example, N1 is equal to 2.

As an example, N1 is equal to 3.

As an example, N1 is equal to 4.

As an example, N2 is equal to 1.

As an example, N2 is equal to 2.

As an example, N2 is equal to 3.

As an example, N2 is equal to 4.

Embodiment 10

As shown in FIG. 10, Embodiment 10 illustrates a schematic diagram of a relationship between a first air-interface resource block, a second air-interface resource block, and a target index according to an embodiment of the present disclosure.

In Embodiment 10, a relative positional relationship of the first air-interface resource block and the second air-interface resource block in the time domain is used to determine whether the target index is the first index or the second index.

In Embodiment 10, the first signaling in the present disclosure is used to determine the first air-interface resource block. The second signaling in this disclosure is used to determine the second air-interface resource block.

As an example, the expression "the relative positional relationship of the first air-interface resource block and the second air-interface resource block in the time domain" includes a sequence of a starting time of the first air-interface resource block and a starting time of the second air-interface resource block in the time domain.

As an example, the expression "the relative positional relationship of the first air-interface resource block and the second air-interface resource block in the time domain" includes a sequence of a cutoff time of the first air-interface resource block and a cutoff time of a second air-interface resource block in the time domain.

As an example, the target index is the first index when the starting time of the first air-interface resource block is earlier than the starting time of the second air-interface resource block. As another example, the target index is the second index when the starting time of the first air-interface resource block is not earlier than the starting time of the second air-interface resource block.

As an example, the target index is the first index when the starting time of the first air-interface resource block is not later than the starting time of the second air-interface resource block. As another example, the target index is the second index when the starting time of the first air-interface resource block is later than the starting time of the second air-interface resource block.

As an example, the target index is the first index when the cutoff time of the first air-interface resource block is earlier than the cutoff time of the second air-interface resource block. As another example, the target index is the second index when the cutoff time of the first air-interface resource block is not earlier than the cutoff time of the second air-interface resource block.

As an example, the target index is the first index when the cutoff time of the first air-interface resource block is not later than the cutoff time of the second air-interface resource block. As another example, when the cutoff time of the first air-interface resource block is later than the cutoff time of the second air-interface resource block, the target index is the second index.

As an example, a time-frequency resource occupied by the first air-interface resource block and a time-frequency resource occupied by the second air-interface resource block satisfy a first set of conditions.

As an example, a time domain resource occupied by the first air-interface resource block and a time domain resource occupied by the second air-interface resource block satisfy a first set of conditions.

As an example, the first air-interface resource block includes a first channel and the second air-interface resource block includes a second channel. The first channel and the second channel satisfy a first set of conditions.

As an example, the first channel is a physical channel.

As an example, the second channel is a physical channel.

As an example, the first air-interface resource block includes a first channel, and the first channel is a PUCCH or PUSCH. The second air-interface resource block includes a second channel and the second channel is a PUCCH or PUSCH. The first channel and the second channel satisfy a first set of conditions.

As an example, the first air-interface resource block includes a PUCCH. The second air-interface resource block includes a PUCCH. A PUCCH included in the first air-interface resource block and a PUCCH included in the second air-interface resource block satisfy a first set of conditions.

As an example, the expression "satisfying a first set of conditions" includes satisfying all conditions in the first set of conditions.

As an example, the first set of conditions includes a positive integer number of conditions.

As an example, the first set of conditions includes timeline conditions.

As an example, the first set of conditions includes timeline conditions, and for a detailed description of the timeline condition, reference may be made to section 9.2.5 of 3GPP TS38.213.

As an example, the first set of conditions includes a condition that the third bit block and the fourth bit block are allowed to be multiplexed on a same channel for transmission.

In the above example, the channel is a physical channel.

In the above example, the channel is a PUCCH.

In the above example, the channel is a PUSCH.

As an example, the cutoff time of the second air-interface resource block is no later than a first time, and the first time is related to the cutoff time of the first air-interface resource block.

In the above example, the first time is the cutoff time of the first air-interface resource block.

In the above example, the first time is after the cutoff time of the first air-interface resource block, and a time interval between the first time and the cutoff time of the first air-interface resource block is equal to a time domain resource occupied by a positive integer number of multi-carrier symbols.

As an example, the relative positional relationship of the first air-interface resource block and the second air-interface resource block in the time domain and at least one of the number of bits included in the first bit block and the number of bits included in the second bit block are used together to determine whether the target index is the first index or the second index.

As an example, the target index is the first index when the number of bits included in the first bit block is greater than the number of bits included in the second bit block or the starting time of the first air-interface resource block is no later than the starting time of the second air-interface resource block. The target index is the second index when the number of bits included in the first bit block is not greater than the number of bits included in the second bit block and a starting time of the first air-interface resource block is earlier than a starting time of the second air-interface resource block.

Embodiment 11

As shown in FIG. 11, Embodiment 11 illustrates a structural block diagram of a processing device in a first node device. In FIG. 11, the processing device of the first node device 1100 includes a first receiver 1101 and a first transmitter 1102.

As an example, the first node device 1100 is a user equipment.

As an example, the first node device 1100 is a relay node.

As an example, the first node device 1100 is an in-vehicle communication device.

As an example, the first node device 1100 is a user equipment that supports V2X communications.

As an example, the first node device 1100 is a relay node that supports V2X communications.

As an example, the first receiver 1101 includes at least one of an antenna 452, a receiver 454, a multi-antenna reception processor 458, a reception processor 456, a controller/processor 459, a memory 460, and a data source 467 in FIG. 4 of the present disclosure.

As an example, the first receiver 1101 includes at least the first five of an antenna 452, a receiver 454, a multi-antenna reception processor 458, a reception processor 456, a controller/processor 459, a memory 460, and a data source 467 in FIG. 4 of the present disclosure.

As an example, the first receiver 1101 includes at least the first four of an antenna 452, a receiver 454, a multi-antenna reception processor 458, a reception processor 456, a controller/processor 459, a memory 460, and a data source 467 in FIG. 4 of the present disclosure.

As an example, the first receiver 1101 includes at least the first three of an antenna 452, a receiver 454, a multi-antenna reception processor 458, a reception processor 456, a controller/processor 459, a memory 460, and a data source 467 in FIG. 4 of the present disclosure.

As an example, the first receiver 1101 includes at least the first two of an antenna 452, a receiver 454, a multi-antenna reception processor 458, a reception processor 456, a controller/processor 459, a memory 460, and a data source 467 in FIG. 4 of the present disclosure.

As an example, the first transmitter 1102 includes at least one of an antenna 452, a transmitter 454, a multi-antenna transmit processor 457, a transmit processor 468, a controller/processor 459, a memory 460, and a data source 467 of FIG. 4 of the present disclosure.

As an example, the first transmitter 1102 includes at least the first five of an antenna 452, a transmitter 454, a multi-antenna transmit processor 457, a transmit processor 468, a controller/processor 459, a memory 460, and a data source 467 in FIG. 4 of the present disclosure.

As an example, the first transmitter 1102 includes at least the first four of an antenna 452, a transmitter 454, a multi-antenna transmit processor 457, a transmit processor 468, a controller/processor 459, a memory 460, and a data source 467 in FIG. 4 of the present disclosure.

As an example, the first transmitter 1102 includes at least the first three of an antenna 452, a transmitter 454, a multi-antenna transmit processor 457, a transmit processor 468, a controller/processor 459, a memory 460, and a data source 467 in FIG. 4 of the present disclosure.

As an example, the first transmitter 1102 includes at least the first two of an antenna 452, a transmitter 454, a multi-antenna transmit processor 457, a transmit processor 468, a controller/processor 459, a memory 460, and a data source 467 of FIG. 4 of the present disclosure.

In Embodiment 11, the first receiver 1101 is used to receive first information and to receive first signaling and second signaling. The first transmitter 1102 is used to transmit a first signal in a target air-interface resource block, the first signal carrying a third bit block and a fourth bit block. The first information indicates that the first signaling includes a first field. The first signaling is used to determine a first bit block. The second signaling is used to determine a second bit block. The first bit block is used to generate the third bit block. The second bit block is used to generate the fourth bit block. An output obtained after all bits in the third bit block and all bits in the fourth bit block are subjected to a first channel coding is used to generate the first signal. The target air-interface resource block corresponds to a target index, the target index is equal to a first index or a second index, and the first index is not equal to the second index. When the target index is equal to the first index, the third bit block is the first bit block, and the fourth bit block is the second bit block or an output obtained after the second bit block is subjected to a second operation. When the target index is equal to the second index, the third bit block is the output obtained after the first bit block is subjected to the first operation, and the fourth bit block is the second bit block. The first bit block corresponds to the first index, and the second bit block corresponds to the second index.

As an example, the first bit block includes a first type of HARQ-ACK. The second bit block includes a second type of HARQ-ACK. The first type of HARQ-ACK is different from the second type of HARQ-ACK. The first type of HARQ-ACK corresponds to the first index. The second type of HARQ-ACK corresponds to the second index. The first signaling indicates the first index; the second signaling indicates the second index.

As an example, when the target index is the first index, the number of bits included in the fourth bit block is not greater than the number of bits included in the second bit block. When the target index is the second index, the number of bits included in the third bit block is not less than the number of bits included in the first bit block.

As an example, at least one of the number of bits included in the first bit block and the number of bits included in the second bit block is used to determine the target index.

As an example, the first signaling indicates the first index and the second signaling indicates the second index. When the target index is the first index, the first signaling indicates the target air-interface resource block from a first air-interface resource block set. When the target index is the second index, the second signaling indicates the target air-interface resource block from a second air-interface resource block set.

As an example, the first signaling is used to determine a first air-interface resource block. The second signaling is used to determine a second air-interface resource block. The relative positional relationship of the first air-interface resource block and the second air-interface resource block in the time domain is used to determine whether the target index is the first index or the second index.

As an example, the first operation includes a second encoding. The second operation includes one or more of a logical AND, a logical OR, an exclusive OR, and a bit deleting operation.

As an example, the target air-interface resource block includes a PUCCH. The first signal is transmitted in a PUCCH, the first signal carrying the third bit block and the fourth bit block. The first signaling and the second signaling each are DCI. The first signaling is used to determine the first bit block. The second signaling is used to determine the second bit block. The first bit block is used to generate the third bit block. The second bit block is used to generate the fourth bit block. The first bit block includes the first type of HARQ-ACK. The second bit block includes the second type of HARQ-ACK. The first index and the second index are priority indexes, respectively. The first index is equal to 1. The second index is equal to 0. The first type of HARQ-ACK corresponds to the first index. The second type of HARQ-ACK corresponds to the second index. The first signaling indicates the first index. The second signaling indicates the second index. An output obtained after all bits in the third bit block and all bits in the fourth bit block are subjected to a first channel coding is used to generate the first signal. The target air-interface resource block corresponds to the target index, and the target index is equal to the first index or the second index. When the target index is equal to the first index, the third bit block is the first bit block, the fourth bit block is the second bit block or the output obtained after the second bit block is subjected to the second operation, and the number of bits included in the fourth bit block is not greater than the number of bits included in the second bit block. When the target index is equal to the second index, the third bit block is the output obtained after the first bit block is subjected to the first operation, the number of bits included in the third bit block is greater than the number of bits included in the first bit block, and the fourth bit block is the second bit block. The first bit block corresponds to the first index, and the second bit block corresponds to the second index. The first operation includes the second encoding, and the second operation includes one or more of a logical AND, a logical OR, an exclusive OR, and a bit deleting operation.

Embodiment 12

Figure 12:
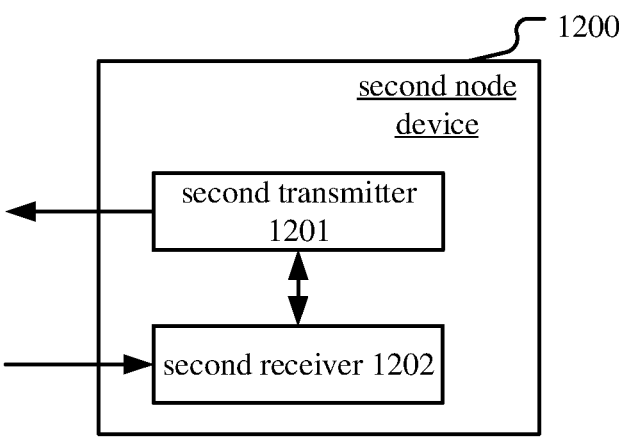
FIG. 12 shows a structural block diagram of a processing device in a second node device according to an embodiment of the present disclosure.

As shown in FIG. 12, Embodiment 12 illustrates a structural block diagram of a processing device in a second node device. In FIG. 12, the processing device of the second node device 1200 includes a second transmitter 1201 and a second receiver 1202.

As an example, the second node device 1200 is a user equipment.

As an example, the second node device 1200 is a base station.

As an example, the second node device 1200 is a relay node.

As an example, the second node device 1200 is an in-vehicle communication device.

As an example, the second node device 1200 is a user equipment that supports V2X communications.

As an example, the second transmitter 1201 includes at least one of an antenna 420, a transmitter 418, a multi-antenna transmit processor 471, a transmit processor 416, a controller/processor 475, and a memory 476 of FIG. 4 of the present disclosure.

As an example, the second transmitter 1201 includes at least the first five of an antenna 420, a transmitter 418, a multi-antenna transmit processor 471, a transmit processor 416, a controller/processor 475, and a memory 476 in FIG. 4 of the present disclosure.

As an example, the second transmitter 1201 includes at least the first four of an antenna 420, a transmitter 418, a multi-antenna transmit processor 471, a transmit processor 416, a controller/processor 475, and a memory 476 in FIG. 4 of the present disclosure.

As an example, the second transmitter 1201 includes at least the first three of an antenna 420, a transmitter 418, a multi-antenna transmit processor 471, a transmit processor 416, a controller/processor 475, and a memory 476 in FIG. 4 of the present disclosure.

As an example, the second transmitter 1201 includes at least the first two of an antenna 420, a transmitter 418, a multi-antenna transmit processor 471, a transmit processor 416, a controller/processor 475, and a memory 476 of FIG. 4 of the present disclosure.

As an example, the second receiver 1202 includes at least one of an antenna 420, a receiver 418, a multi-antenna reception processor 472, a reception processor 470, a controller/processor 475, and a memory 476 of FIG. 4 of the present disclosure.

As an example, the second receiver 1202 includes at least the first five of an antenna 420, a receiver 418, a multi-antenna reception processor 472, a reception processor 470, a controller/processor 475, and a memory 476 of FIG. 4 of the present disclosure.

As an example, the second receiver 1202 includes at least the first four of an antenna 420, a receiver 418, a multi-antenna reception processor 472, a reception processor 470, a controller/processor 475, and a memory 476 of FIG. 4 of the present disclosure.

As an example, the second receiver 1202 includes at least the first three of an antenna 420, a receiver 418, a multi-antenna reception processor 472, a reception processor 470, a controller/processor 475, and a memory 476 in FIG. 4 of the present disclosure.

As an example, the second receiver 1202 includes at least the first two of an antenna 420, a receiver 418, a multi-antenna reception processor 472, a reception processor 470, a controller/processor 475, and a memory 476 of FIG. 4 of the present disclosure.

In Embodiment 12, the second transmitter 1201 is used to transmit first information, and to transmit first signaling and second signaling. The second receiver 1202 is used to receive a first signal in a target air-interface resource block, the first signal carrying a third bit block and a fourth bit block. The first information indicates that the first signaling includes a first field. The first signaling is used to determine a first bit block. The second signaling is used to determine a second bit block. The first bit block is used to generate the third bit block. The second bit block is used to generate the fourth bit block. An output obtained after all bits in the third bit block and all bits in the fourth bit block are subjected to a first channel coding is used to generate the first signal. The target air-interface resource block corresponds to a target index, the target index is equal to a first index or a second index, and the first index is not equal to the second index. When the target index is equal to the first index, the third bit block is the first bit block, and the fourth bit block is the second bit block or the output obtained after the second bit block is subjected to a second operation. When the target index is equal to the second index, the third bit block is the output obtained after the first bit block is subjected to the first operation, and the fourth bit block is the second bit block. The first bit block corresponds to the first index, and the second bit block corresponds to the second index.

As an example, the first bit block includes a first type of HARQ-ACK. The second bit block includes a second type of HARQ-ACK. The first type of HARQ-ACK is different from the second type of HARQ-ACK. The first type of HARQ-ACK corresponds to the first index. The second type of HARQ-ACK corresponds to the second index. The first signaling indicates the first index. The second signaling indicates the second index.

As an example, when the target index is the first index, the number of bits included in the fourth bit block is not greater than the number of bits included in the second bit block. When the target index is the second index, the number of bits included in the third bit block is not less than the number of bits included in the first bit block.

As an example, at least one of the number of bits included in the first bit block and the number of bits included in the second bit block is used to determine the target index.

As an example, the first signaling indicates the first index and the second signaling indicates the second index. When the target index is the first index, the first signaling indicates the target air-interface resource block from a first air-interface resource block set. When the target index is the second index, the second signaling indicates the target air-interface resource block from a second air-interface resource block set.

As an example, the first signaling is used to determine a first air-interface resource block. The second signaling is used to determine a second air-interface resource block. The relative positional relationship of the first air-interface resource block and the second air-interface resource block in the time domain is used to determine whether the target index is the first index or the second index.

As an example, the first air-interface resource block is an air-interface resource block in the first air-interface resource block set, and the second air-interface resource block is an air-interface resource block in the second air-interface resource block set.

As an example, the first operation includes a second encoding. The second operation includes one or more of a logical AND, a logical OR, an exclusive OR, and a bit deleting operation.

Those of ordinary skill in the art will appreciate that all or part of the operations in the above method may be performed by instructing the related hardware through a program, which may be stored in a computer-readable storage medium, such as a read-only memory, a hard disk, or an optical disk, etc. Alternatively, all or part of the operations of the above embodiments may also be implemented using one or more integrated circuits. Accordingly, each module unit in the above embodiments may be implemented in the form of hardware or in the form of a software functional module, and the present disclosure is not limited to any particular combination of software and hardware. The first node device in the present disclosure includes but is not limited to a mobile phone, a tablet computer, a notebook, a network card, a low-power device, a LTE enhancements for Machine Type Communications (eMTC) device, a narrow band Internet of Things (NB-IOT) device, a vehicle-mounted communication device, an aircraft, an airplane, an unmanned aerial vehicle, a remote control aircraft, and other wireless communication devices. The second node device in the present disclosure includes but is not limited to a wireless communication device such as a mobile phone, a tablet computer, a notebook, a network card, a low-power device, an eMTC device, an NB-IOT device, a vehicle-mounted communication device, an aircraft, an airplane, an unmanned aerial vehicle, a remote control aircraft, etc. The user equipment or UE or terminal in the present disclosure includes but is not limited to a wireless communication device such as a mobile phone, a tablet computer, a notebook, a network card, a low-power device, an eMTC device, an NB-IOT device, a vehicle-mounted communication device, an aircraft, an airplane, an unmanned aerial vehicle, a remote control aircraft, and the like. The base station device or base station or network side device in the present disclosure includes but is not limited to a macro cellular base station, a micro cellular base station, a home base station, a relay base station, an evolved node B (eNB), a next generation Node B (gNB), a transmitter receiver point (TRP), a global navigation satellite system (GNSS), a relay satellite, a satellite base station, an air base station, and other wireless communication devices.

The foregoing merely describes some preferred embodiments of the present disclosure and is not intended to limit the scope of protection of the present disclosure. Any modification, equivalent replacement, improvement, etc. made within the spirit and principles of the present disclosure shall be included in the scope of protection of the present disclosure.

What is claimed is:

1. A first node device for wireless communication, comprising:

a first receiver to receive first information and receive first signaling and second signaling; and a first transmitter to transmit a first signal in a target air-interface resource block, the first signal carrying a third bit block and a fourth bit block, wherein the first information indicates that the first signaling comprises a first field, the first signaling is used to determine a first bit block, the second signaling is used to determine a second bit block, the first bit block is used to generate the third bit block, the second bit block is used to generate the fourth bit block, and an output, obtained after all bits in the third bit block and all bits in the fourth bit block are subjected to a first channel coding, is used to generate the first signal;

the target air-interface resource block corresponds to a target index, the target index is equal to a first index or a second index, and the first index is not equal to the second index;

in response to the target index being equal to the first index, the third bit block is the first bit block, and the fourth bit block is the second bit block or an output obtained after the second bit block is subjected to a second operation; and in response to the target index being equal to the second index, the third bit block is an output obtained after the first bit block is subjected to a first operation, and the fourth bit block is the second bit block, and wherein the first bit block corresponds to the first index, and the second bit block corresponds to the second index, wherein in response to the target index being the first index, the number of bits comprised in the fourth bit block is not greater than the number of bits comprised in the second bit block; and in response to the target index being the second index, the number of bits comprised in the third bit block is not less than the number of bits comprised in the first bit block.

2. The first node device of claim 1, wherein the first bit block comprises a first type of hybrid automatic repeat request acknowledgement (HARQ-ACK), the second bit block comprises a second type of HARQ-ACK, and the first type of HARQ-ACK is different from the second type of HARQ-ACK; and wherein the first type of HARQ-ACK corresponds to the first index, the second type of HARQ-ACK corresponds to the second index, the first signaling indicates the first index, and the second signaling indicates the second index.

3. The first node device of claim 1, wherein at least one of the number of bits comprised in the first bit block and the number of bits comprised in the second bit block is used to determine the target index.

4. The first node device of claim 1, wherein the first signaling indicates the first index and the second signaling indicates the second index;

in response to the target index being the first index, the first signaling indicates the target air-interface resource block from a first air-interface resource block set; and in response to the target index being the second index, the second signaling indicates the target air-interface resource block from a second air-interface resource block set.

5. The first node device of claim 1, wherein the first signaling is used to determine a first air-interface resource block, the second signaling is used to determine a second air-interface resource block, and a relative positional relationship between the first air-interface resource block and the second air-interface resource in a time domain is used to determine whether the target index is the first index or the second index.

6. The first node device of claim 1, wherein the first operation comprises a second encoding, and the second operation comprises at least one of a logical AND, a logical OR, an exclusive OR, and a bit deleting operation.

7. The first node device of claim 1, wherein the second operation comprises a second encoding, and the first operation comprises at least one of a logical AND, a logical OR, an exclusive OR, and a bit deleting operation.

8. The first node device of claim 1, wherein the target index is an index of the target air-interface resource block in a target air-interface resource block set, and the target air-interface resource block set is a first air-interface resource block set or a second air-interface resource block set.

9. The first node device of claim 8, wherein the first air-interface resource block set comprises a positive integer number of air-interface resource blocks, the second air-interface resource block set comprises a positive integer number of air-interface resource blocks, and the positive integer number of air-interface resource blocks comprised in the first air-interface resource block set and the positive integer number of air-interface resource blocks comprised in the second air-interface resource block set are reserved for different classes of uplink control information, respectively.

10. The first node device of claim 1, wherein the target air-interface resource block comprises one of a high-priority physical uplink control channel (PUCCH) or a low-priority PUCCH, and the target index is a priority index.

11. The first node device of claim 1, wherein the first field is one of a frequency hopping flag field, a second downlink assignment index field, a field of precoding information and number of layers, a CBG transmission information (CBGTI) field, and a priority indicator field.

12. The first node device of claim 1, wherein the first bit block comprises information indicating whether the first signaling is received correctly, and the second bit block comprises information indicating whether the second signaling is received correctly.

13. The first node device of claim 1, wherein the target index is used to determine one priority from a plurality of priorities, and the plurality of priorities comprise a high priority and a low priority.

14. The first node device of claim 1, wherein the target index is used to determine a service type from a plurality of service types, and the plurality of service types comprise an ultra-reliable and low latency communication (URLLC) service type and an enhance mobile broadband (eMBB) service type.

15. The first node device of claim 1, wherein the first index indicates one priority of a low priority and a high priority, and the second index indicates the other priority of the low priority and the high priority.

16. The first node device of claim 1, wherein the first index indicates one service type of an URLLC service type and an eMBB service type, and the second index indicates the other service type of the URLLC service type and the eMBB service type.

17. The first node device of claim 3, wherein
the target index is the second index in response to the number of bits comprised in the first bit block being greater than the number of bits comprised in the second bit block; and
the target index is the first index when the number of bits comprised in the first bit block is not greater than the number of bits comprised in the second bit block.

18. A second node device for wireless communication, comprising:
a second transmitter to transmit first information, and transmit first signaling and second signaling; and
a second receiver to receive a first signal in a target air-interface resource block, the first signal carrying a third bit block and a fourth bit block, wherein
the first information indicates that the first signaling comprises a first field, the first signaling is used to determine a first bit block, the second signaling is used to determine a second bit block, the first bit block is used to generate the third bit block, the second bit block is used to generate the fourth bit block, and an output, obtained after all bits in the third bit block and all bits in the fourth bit block are subjected to a first channel coding, is used to generate the first signal;

the target air-interface resource block corresponds to a target index, the target index is equal to a first index or a second index, and the first index is not equal to the second index;
in response to the target index being equal to the first index, the third bit block is the first bit block, and the fourth bit block is the second bit block or an output obtained after the second bit block is subjected to a second operation; and
in response to the target index being equal to the second index, the third bit block is an output obtained after the first bit block is subjected to a first operation, and the fourth bit block is the second bit block, and wherein the first bit block corresponds to the first index, and the second bit block corresponds to the second index, wherein
in response to the target index being the first index, the number of bits comprised in the fourth bit block is not greater than the number of bits comprised in the second bit block; and
in response to the target index being the second index, the number of bits comprised in the third bit block is not less than the number of bits comprised in the first bit block.

19. A method for a first node in wireless communication, comprising:
receiving first information and receiving first signaling and second signaling; and
transmitting a first signal in a target air-interface resource block, the first signal carrying a third bit block and a fourth bit block, wherein
the first information indicates that the first signaling comprises a first field, the first signaling is used to determine a first bit block, the second signaling is used to determine a second bit block, the first bit block is used to generate the third bit block, the second bit block is used to generate the fourth bit block, and an output, obtained after all bits in the third bit block and all bits in the fourth bit block are subjected to a first channel coding, is used to generate the first signal;
the target air-interface resource block corresponds to a target index, the target index is equal to a first index or a second index, and the first index is not equal to the second index;
in response to the target index being equal to the first index, the third bit block is the first bit block, and the fourth bit block is the second bit block or an output obtained after the second bit block is subjected to a second operation; and
in response to the target index being equal to the second index, the third bit block is an output obtained after the first bit block is subjected to a first operation, and the fourth bit block is the second bit block, and wherein the first bit block corresponds to the first index, and the second bit block corresponds to the second index, wherein
in response to the target index being the first index, the number of bits comprised in the fourth bit block is not greater than the number of bits comprised in the second bit block; and
in response to the target index being the second index, the number of bits comprised in the third bit block is not less than the number of bits comprised in the first bit block.

* * * * *